US006244824B1

(12) United States Patent
Centers et al.

(10) Patent No.: US 6,244,824 B1
(45) Date of Patent: Jun. 12, 2001

(54) SYSTEM AND METHODS FOR CONTROLLING ROTARY SCREW COMPRESSORS

(75) Inventors: Steven D. Centers, Daphne, AL (US); Paul Burrell, Norcross, GA (US)

(73) Assignee: Coltec Industries Inc.

( * ) Notice: Subject to any disclaimer, the term of this patent is extended or adjusted under 35 U.S.C. 154(b) by 0 days.

(21) Appl. No.: 09/377,546

(22) Filed: Aug. 19, 1999

Related U.S. Application Data

(63) Continuation of application No. 08/946,635, filed on Oct. 8, 1997, which is a continuation of application No. 08/346,251, filed on Nov. 23, 1994, now Pat. No. 5,713,724.

(51) Int. Cl.[7] ..................................................... F04B 49/02
(52) U.S. Cl. .............................................. 417/18; 417/280
(58) Field of Search .................................. 417/18, 280, 36

(56) References Cited

U.S. PATENT DOCUMENTS 4,249,866  2/1981  Shaw et al. ............................ 417/280
4,969,801  11/1990  Haseley et al. ........................ 417/18
5,713,724  * 2/1998  Centers et al. .......................... 417/53

* cited by examiner

Primary Examiner—Charles G. Freay
Assistant Examiner—Ehud Gartenberg
(74) Attorney, Agent, or Firm—Cummings & Lockwood

(57) ABSTRACT

An electronic control system dynamically varies the output capacity of a compressor by controlling plural valves associated with the compressor to provide pressurized air to a distribution system at an appropriate rate. The control system operates in any of three modes for standalone operation, including continuous run, auto/dual pressure band, and target pressure modes. In the first two modes, pressure bands are dynamically calculated based on load and unload values entered by an operator. These electronic control systems can also be connected in a peer-to-peer network to coordinate control of up to 16 compressors feeding the same distribution system, so as to maintain a desired target pressure in the system. A modem connected to the system supports remote diagnostics, monitoring, and control. Specialized startup, operating, and shutdown diagnostic algorithms prevent damage to the compressor and avert unsafe operating conditions.

2 Claims, 23 Drawing Sheets

SYSTEM AND METHODS FOR CONTROLLING ROTARY SCREW COMPRESSORS

This application is a continuation of co-pending U.S. patent application Ser. No. 08/946,635 filed Oct. 8, 1997, which is a continuation of U.S. patent application Ser. No. 08/346,251, filed Nov. 23, 1994 now U.S. Pat. No. 5,713,724, issued Feb. 3, 1998, the disclosure of each is herein incorporated by reference.

This disclosure includes a microfiche appendix of 1,150 frames on 12 fiches, the entirety of which is copyright © 1993, 1994, Coltec Industries, Inc. The copyright owner has an objection to the facsimile reproduction by anyone of the patent disclosure, as it appears in the Patent and Trademark Office patent files or records, but otherwise reserves all copyright rights whatsoever.

FIELD OF THE INVENTION

This invention relates to electronic control systems and control methods for operating one or more compressors, particularly including rotary screw compressors.

BACKGROUND OF THE INVENTION

Rotary screw compressors, such as the compressor disclosed in U.S. Pat. No. 4,435,139, have long been used to provide compressed air in industry. The rotary screw compressor comprises two rotors mounted in a working space limited by two end walls and a barrel wall extending therebetween. The barrel wall takes the shape of two intersecting cylinders, each housing one of the rotors. Each rotor is provided with helically extending lobes and grooves which are intermeshed to establish chevron shaped compression chambers. In these chambers, a gaseous fluid is displaced and compressed from an inlet channel to an outlet channel by way of the screw compressor. Each compression chamber during a filling phase communicates with the inlet, during a compression phase undergoes a continued reduction in volume, and during a discharge phase communicates with an outlet. Rotary screw compressors of this kind are often provided with valves for regulating the built-in volume ratio for the capacity of the compressor. When continued regulation is required, slide valves are often used, however, with other regulation needs, it is sufficient to use bypass valves. Such bypass valves are mounted in the barrel wall of the compressor or may be mounted in one of the end walls and in this regard, normally in the high pressure end wall. A bypass valve arrangement of this general type is shown in U.S. Pat. No. 4,453,900 issued Jun. 12, 1984. However, the opening of the bypass valve is directly dependent upon the compression spring as well as the internal pressure of the compressor. The opening and closing of this type of valve is unreliable due to friction, corrosion and other environmental factors which often derogate the positioning this type of bypass valve. Further, while the face of the valve element takes on the approximate shape of the barrel, the valve element is separately formed by casting or other process within predetermined tolerances. In order to economically manufacture such valve elements, the tolerances must be some what relaxed which may result in the leakage of pressurized fluid between compression chambers thereby degrading the efficiency of the compressor.

These compressors may be controlled by electronic circuits, such as those disclosed in U.S. Pat. Nos. 4,336,001 and 4,227,862 to Andrew et al., which show electronically controlled startup and shutdown routines and control of a bypass slide valve to vary compressor output to maintain pressure at a selected setpoint.

U.S. Pat. Nos. 4,519,748, 4,516,914, and 4,548,549 to Murphy et al. and U.S. Pat. No. 4,609,329 to Pillis et al. show additional electronic control systems for compressors. However, the operating modalities of these systems are primarily designed for refrigerant compression.

U.S. Pat. No. 4,502,842 to Currier et al., assigned to Colt Industries Operating Corp., shows a single electronic control system which can be connected to control a plurality of variably sized compressors. The system gathers data on the operating characteristics of the controlled compressors during a calibration phase and then uses this information to load and unload the compressors during operation, maintaining a preset pressure which can be programmed to vary with time. High and low pressure set points are programmed into the electronic control system and the compressors are selective loaded and unloaded in a predetermined sequence. However, centralized master controllers of this type represent a single point of failure for the entire pressurized air system, and are lacking in versatility since they provide only a limited selection of control modalities.

U.S. Pat. No. 4,335,582 to Shaw et al. shows a system for unloading a helical screw compressor in a refrigeration system. A slide valve is connected so that upon compressor shutdown, the slide valve is automatically driven to a full unload position. This operation is accomplished with air pressure rather than with an electronic control system.

None of the electronic control systems described above provide a complete and versatile solution to the problems experienced when operating one or more compressors in a variety of plant installations with a variety of air storage capacities. In fact, the networking capabilities and choice of operating modes in prior art systems of the type described above, and the ability of the systems to dynamically adjust to changing conditions, are quite limited.

Thus, the inventors have found that there is a need for an improved and more versatile electronic control system for rotary screw compressor installations that will provide more efficient, safe, and reliable compressor operation.

SUMMARY OF THE INVENTION

Therefore, it is a general object of the present invention to provide a novel and improved electronic control system for controlling a compressor.

Another general object of the invention is to provide a novel and improved electronic control system for coordinating the operation of a plurality of electronic compressor control units.

A further general object of the invention to provide novel and improved methods for electronically controlling a compressor.

An additional general object of the invention is to provide novel and improved methods for interconnecting a plurality of electronic compressor control units to coordinate control of a plurality of compressors.

A more specific object of the present invention is to provide a novel and improved electronic control system for interactively controlling a plurality of rotary screw compressors in a peer-to-peer network where each compressor has a controller that communicates with other controllers in the network and controls its associated compressor in accordance with predetermined network control algorithms.

Another object of the invention is to provide an electronic control system with a self-adjusting control algorithm which automatically adjusts the operating points of compressor capacity control valves in response to changes in pressure setpoints.

Yet another object of the invention is to provide a method of dynamically adjusting pressure deadbands in a continuous run or auto/dual operation mode in response to changes in operator inputs, and in response to system characteristics sensed over time using a state machine algorithm.

A further object of the invention is to provide a versatile electronic compressor control system and method providing a plurality of operational mode choices, including a continuous run mode, an auto/dual operation mode, a pressure setpoint mode, and a networked multiple machine pressure setpoint mode.

It is also an object of the invention to provide electronic control systems for compressors which can be networked to create a virtual compressor array, with the individual electronic control systems providing coordinated peer-to-peer control of the compressor array for maximum operating efficiency in response to varying demand conditions.

Another object of the invention is to provide an electronic compressor control system with a manual operation mode which disables electronic control of the compressor system and operates the compressor based on a redundant mechanical and pressure control apparatus provided in the compressor system.

Yet another object of the invention is to provide an improved electronic control system for a compressor in which complete information describing the configuration and operating status of each compressor in a network is reported to each of the electronic control systems connected to the network.

An additional object of the invention is to provide a peer-to-peer network for electronic compressor control systems which configures itself automatically upon startup and will continue to operate despite the failure of any individual electronic control system forming a part of the network.

Another object of the invention is to provide a system and method for remote access via a communications link to an electronic compressor control system, permitting diagnosis, monitoring, control, and firmware updates without an on-site service call.

It is also an object of the invention to provide a system and method for remote access to a network of electronic compressor control systems, permitting monitoring, control, diagnosis, and firmware updates of any electronic control system in the network through a link to a single system in the network.

Another object of the invention is to provide an improved user interface for an electronic compressor control system including menu driven operation and a simplified, fail-safe control panel providing easy to understand operating status and fault specifications.

Yet another object of the invention is to provide an improved electronic compressor control system and method in which operating condition data is archived to facilitate diagnosis of compressor problems and to aid in fine tuning operating modes and setpoints to achieve peak operating efficiency of the compressor system.

Another object of the invention is to provide an improved electronically operated lift valve control system and method utilizing double acting lift valves to positively open and close bypass passages for varying the output capacity of the compressor.

A further object of the invention is to electronically detect unsafe operating conditions using an electronic control system for a compressor, and to prevent operation of the system when a failure is detected.

Another object of the invention is to electronically detect reverse rotation of a compressor motor using an electronic control system associated with the compressor, and to shut down the compressor and provide a warning when reverse rotation has been detected.

It is also an object of the invention to provide an electronic control system and method for a compressor system which allows testing of capacity control valve operation, including the inlet valve.

Another object of the invention is to provide an electronic control system and method for operating a compressor system which provides an orderly electronically controlled shutdown and blowdown of the compressor in response to an operator command.

Still another object of the invention is to provide an improved electronically controlled compressor system and method which prevents rapid cycling of a compressor inlet valve during periods of reduced demand by automatically switching between a cycling mode and a modulation mode of operation based on the settings of operator-adjustable control parameters.

These and other objects of the invention which will be apparent on reviewing the specification and microfiche appendix can be achieved using the improved electronic control system and methods disclosed herein.

In a preferred embodiment, an electronic control system dynamically varies the output capacity of a compressor by controlling plural valves associated with the compressor to provide pressurized air to a distribution system at an appropriate rate. The control system operates in any of three modes for standalone operation, including continuous run, auto/dual pressure band, and target pressure modes. In the first two modes, pressure bands are dynamically calculated based on load and unload values entered by an operator. These electronic control systems can also be connected in a peer-to-peer network to coordinate control of up to 16 compressors feeding the same distribution system, so as to maintain a desired target pressure in the system. A modem connected to the system supports remote diagnostics, monitoring, and control. Specialized startup, operating, and shutdown diagnostic algorithms prevent damage to the compressor and avert unsafe operating conditions.

DETAILED DESCRIPTION OF THE PREFERRED EMBODIMENTS

Figure 1:
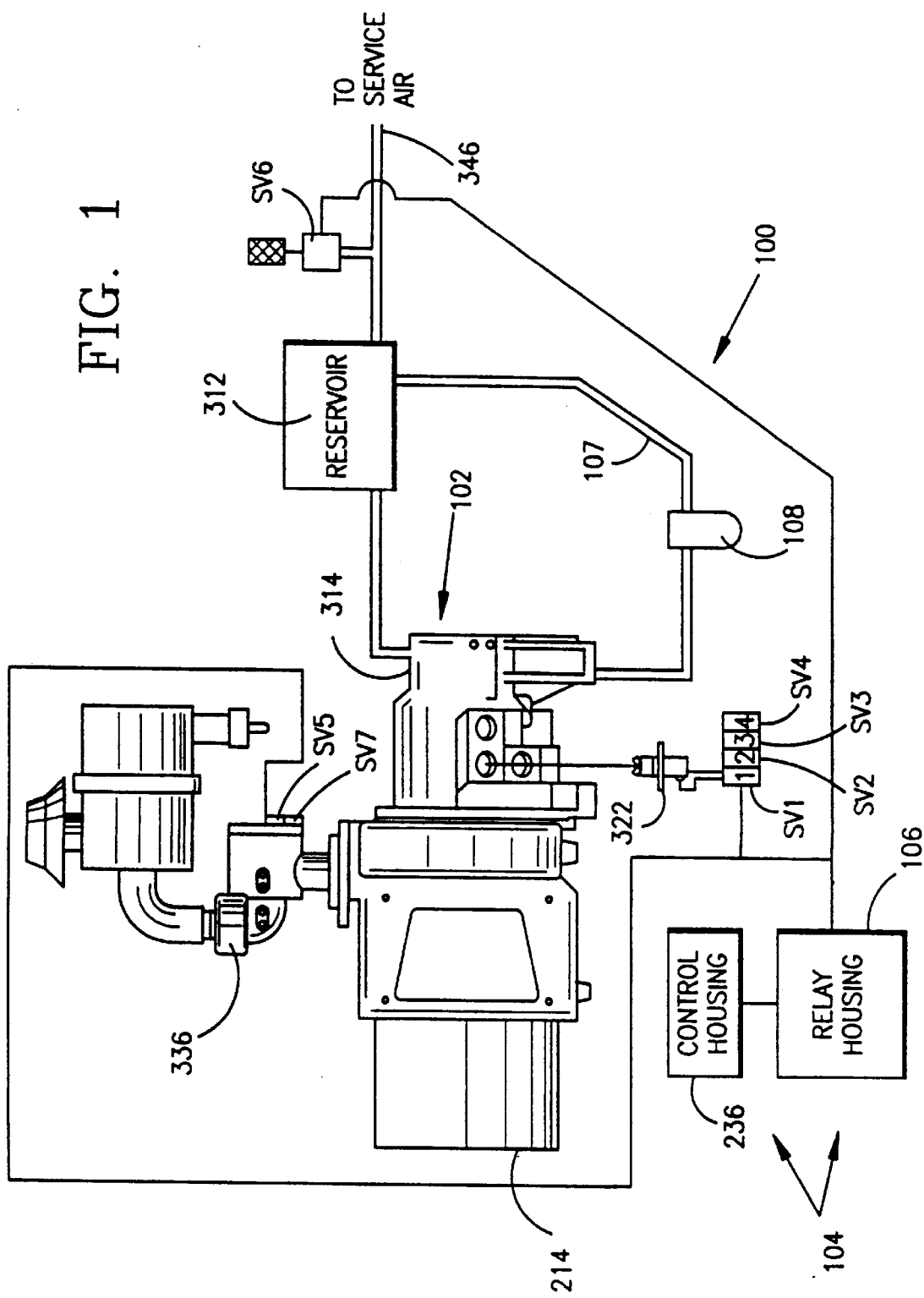
FIG. 1 is a diagram of an improved compressor useful with the control system and methods of the invention.

This invention relates to an improved electronic system and improved methods for controlling one or more compressors. The apparatus and methods disclosed are particularly applicable to control of rotary screw compressors used to provide industrial compressed air supplies, although the methods may also be applied to other types of compressors in other applications. FIG. 1 is a block schematic diagram showing a compressor system 100 of the present invention. Compressor system 100 preferably includes an improved oil-flooded rotary screw compressor 102 and an electronic control system 104. In the preferred embodiment of the invention, compressor 102 is of the type described in a co-pending application entitled "Valve System for Capacity Control of a Screw Compressor and Method of Manufacturing Such Valves," naming Jan Zuercher, John Q. Richardson, and Arthur Legault as inventors, filed Nov. 23, 1994 and assigned to the same assignee as this application.

This related co-pending application is incorporated in the present disclosure by reference, and constitutes the primary source of detailed disclosure on the design of compressor 102. However, those features of compressor 102 that are most relevant to the operation of the control system and methods of the present invention will be described briefly in enough detail to facilitate use of the inventive control system. Referring again to FIG. 1, compressor 102 is powered by electric motor 214. Electronic control system 104 includes control housing 236 (containing the main electronic control components of the system), and relay housing 106 containing relays and switchgear for the system. Air end discharge pressure point 314 of compressor 102 is connected to pressurize reservoir 312, which accumulates pressurized air and provides pressure to service air output 346. Compressor lubricant oil (present in the air output because of the oil-flooded operation of compressor 102) is collected from the compressed air output of compressor 102 in a separator (not shown) within reservoir 312, and returned to the compressor through oil line 107 flowing through an oil cooler (not shown) and a lubricant filter 108.

Compressor 102 is provided with four capacity reduction valves, also referred to as lift valves. When actuated, each lift valve acts to effectively bypass a part of the compressor screw, thus reducing compressor 102 capacity approximately 12.5%. Thus, by opening one lift valve, a 12.5% reduction in output capacity is obtained, and by opening all four lift valves, capacity of the compressor is reduced by 50%. Intermediate levels of capacity reduction, such as 25% and 37.5%, are similarly obtained by opening from one to four of the lift valves. For clarity, only one capacity reduction valve, lift valve 322, is shown in FIG. 1. Each of the lift valves is a positive double action air operated valve, and each is controlled by a solenoid valve in response to signals from electronic control system 104. The four solenoid valves connected to control lift valves 322, 324, 326, and 328 respectively are designated in the drawing as SV1, SV2, SV3, and SV4.

Compressor 102 has an inlet valve 336 controllable to vary the amount of inlet air supplied to compressor 102. When inlet valve 336 is closed, no air is provided to compressor 102, so compressor 102 is "unloaded" and runs freely with minimal resistance. When inlet valve 336 is fully open, the compressor is "loaded" or provided with input air. Inlet valve 336 can also be controlled to open partially in a "modulated" operating mode, so that compressor 102 is only partially loaded. The operation of inlet valve 336 is controlled by solenoid valves SV5 and SV7 which respond to signals from electronic control system 104. Valve SV5, when activated, closes inlet valve 336 and unloads compressor 102. Valve SV7, when activated, partially closes inlet valve 336 so that compressor 102 is only partially loaded. Valve SV7 is connected to a proportional regulator. Thus, when activated, valve SV7 provides closing pressure through the proportional regulator to inlet valve 336 that varies with the pressure in reservoir 312. As system pressure is increased, the amount of closure of inlet valve 336 upon activation of valve SV7 is also increased. Electronic control system 104 is also connected to blowdown valve SV6 which can be activated to release pressure from the system at shutdown.

Figure 2:
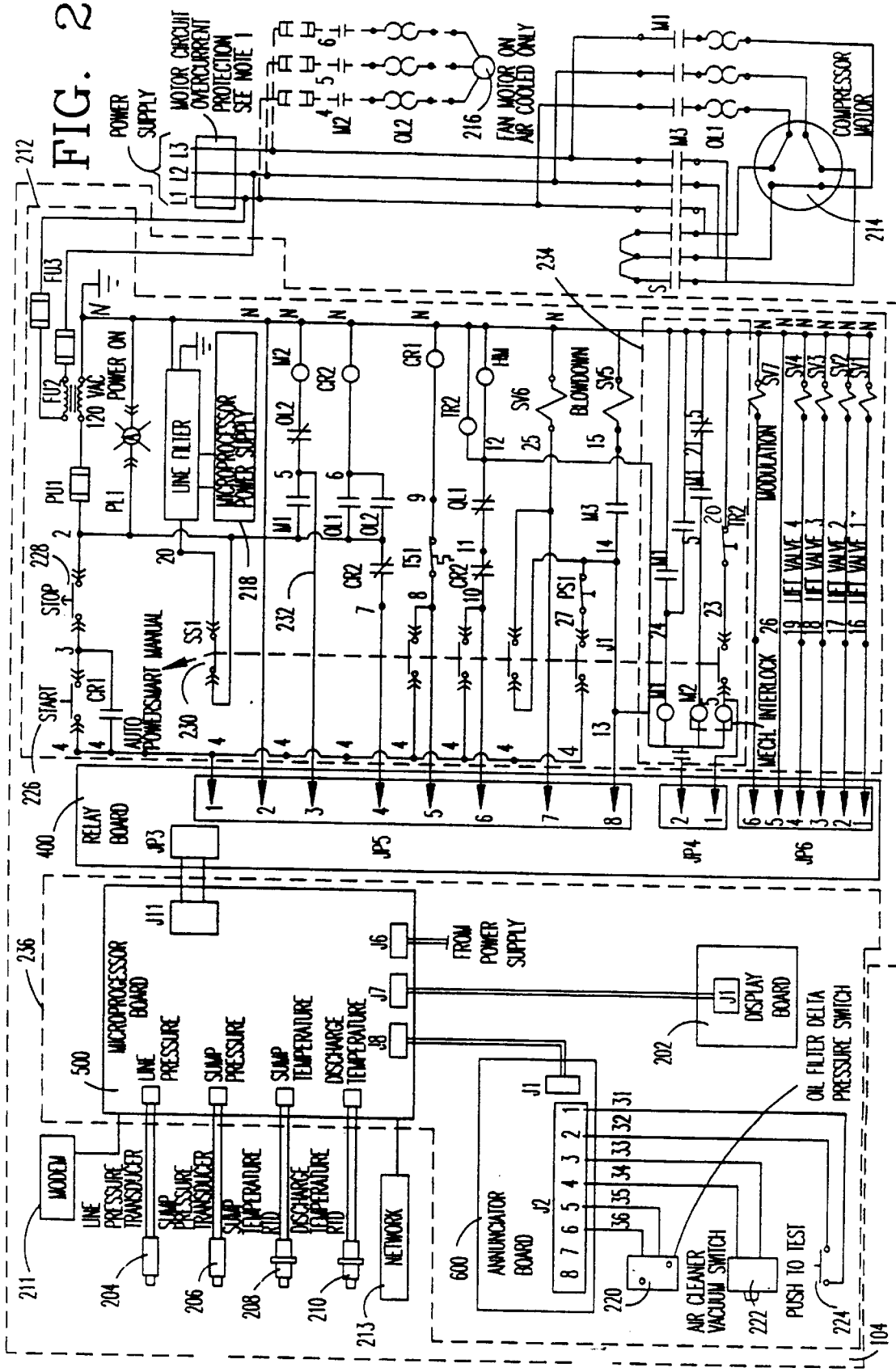
FIG. 2 is a block schematic diagram showing the electrical control elements in a preferred embodiment of the inventive electronic control system, connected for wye-delta operation of the compressor motor.

FIG. 2 is a block schematic diagram showing the electrical control elements in a preferred embodiment of electronic control system 104. As shown in FIG. 2, electronic control system 104 includes relay board 400, microprocessor board 500, annunciator board 600, display board 202, line pressure transducer 204, sump pressure transducer 206, sump temperature transducer 208, discharge temperature transducer 210, modem 211, power and relay connections 212, network connection 213, oil filter delta pressure switch 220, air cleaner vacuum switch 222, and lamp test button 224.

Electronic control system 104 is connected to motor 214 which is powered by three phase AC power supply lines L1, L2, and L3. The power supply lines are connected to motor 214 through appropriate conventional overcurrent protection circuits (not shown). A fan motor 216 is provided in cases where compressor 102 is to be air cooled.

Preferably, microprocessor board 500, annunciator board 600, and display board 202 are installed in a control housing 236 and connected to relay board 400 and the various sensors by appropriate cables. Relay board 400, along with power and relay connections 212, are preferably installed in relay housing 106 of compressor system 100 (shown in FIG. 1). Modem 211 may be installed in control housing 236 or may be a standalone component. Network connection 213 provides a network interface connection for linking multiple electronic control systems 104 at a site. Preferably, network connection 213 provides an ARCnet standard peer-to-peer network interface.

Microprocessor board 500 has a connector J11 which is connected by a cable to connector JP3 of relay board 400. Microprocessor board 500 is also connected to line pressure transducer 204 and discharge temperature transducer 210, which are installed external to compressor system 100 in the air line pressurized by compressor system 100. Line pressure transducer 204 measures the pressure in the customer line being serviced by compressor system 100, and discharge temperature transducer 210 measures the temperature of the discharge air. Similarly, microprocessor board 500 is operatively connected to sump pressure transducer 206, which measures pressure in reservoir 312 of system 100, and sump temperature transducer 208 which measures the temperature in reservoir 312. Temperature transducers 210 and 208 are preferably resistance temperature measurement devices. Thus, microprocessor board 500 can monitor line and sump pressures and temperatures and control operation of the system accordingly.

Microprocessor board 500 has another connector, identified as J7, which is connected through a cable to connector J1 of display board 202. Display board 202 includes a four line by 40 character liquid crystal display installed on a front panel of housing 236, and also includes driver circuits for displaying information on the liquid crystal display. The connection of microprocessor board 500 to display board 202 permits microprocessor board 500 to activate the driver circuits of display board 202 and thus control the liquid crystal display to provide information to system operators and maintenance personnel.

Microprocessor board 500 is provided with a serial interface for connecting to modem 211, which may be a conventional wireline telephone modem. Modem 211 permits communication between electronic control system 104 and remotely located stations for purposes of real time operations monitoring, maintenance and service diagnosis, transmission of status reports, and downloading operating firmware for electronic control system 104. In a modem mode of operation, electronic control system 104 can be called by a phone line from a remotely located personal computer. When a connection is made, the remote PC can access all information of electronic control system 104 that can be seen by a local operator. All operating parameters, service information, and shutdown records stored in electronic control system 104 are transmitted to the remote PC. All sensor input information, including sensed temperatures and pressures, are transmitted to the PC on a real time basis. The information displayed for the operator of electronic control system 104 is also displayed on the remote PC.

All of the stored operating parameters of electronic control system 104 can be modified by the operator of the PC through transmissions over the link established through modem 211. In addition, electronic control system 104 can receive a message from the PC and display the message on display 702 to provide instructions or information to the local operator. This feature is particularly useful for remote diagnosis of system operating problems.

In addition, new control firmware may be downloaded to electronic control system 104 from the remote PC, and stored in flash memory provided for that purpose on microprocessor board 500. To cause entry into a firmware download mode, a local operator must power down electronic control system 104, and hold down the F3 button in switch array 704 while powering up electronic control system 104. During and after the firmware downloading process, electronic control system 104 is also programmed to perform integrity checks on downloaded firmware, such as byte-by-byte verification and/or checksum verification, to ensure integrity of the new firmware before permitting restarting of compressor 102.

A local RS232 port will also be provided as part of microprocessor board 500 in a manner which will be described in more detail with reference to FIG. 5. This local RS232 port can be used to connect electronic control system 104 to a local PC. Electronic control system 104 will provide the same control, monitoring, and firmware updating functionality via the local RS232 port, the only difference being that the PC will be directly connected to electronic control system 104 rather than being connected via modem 211.

Connector J8 of microprocessor board 500 is connected through a cable to connector J1 of annunciator board 600. Annunciator board 600 is connected through connector J2 to oil filter delta pressure switch 220, air cleaner vacuum switch 222, and lamp test button 224. Oil filter delta pressure switch 220 is connected across lubricant filter 108 (shown in FIG. 1) to provide an indication when there is a significant difference in pressure before and after filter 108, indicating that filter 108 requires service.

As part of power and relay connections 212, a power supply 218 is provided for the electronic components on relay board 400, microprocessor board 500, annunciator board 600, and display board 202. Power supply 218 is connected to microprocessor board 500 through connector J6 (this connection is omitted form the drawing to enhance clarity).

Power and relay connections 212 also include a normally open start button 226, a normally closed stop button 228, and a mode switch 230 (SS1). Mode switch 230 allows the operator to select an automatic operation mode, using the microprocessor of electronic control system 104, or a manual operation mode. The manual mode is provided in case of failure of electronic control system 104 or any of its sensors or switches. The piping of compressor system 100 includes a redundant pneumatic/mechanical control system which operates based on pressure switches. Thus, if electronic control system 104 fails and continued operation of compressor 102 is essential, compressor system 100 can be opened in a manual, non-electronic control mode to maintain an air supply to the service air system while awaiting repair of electronic control system 104. The lift valves are connected to be closed in the absence of control signals opening them, so that in case of a control failure, the lift valves will automatically close so the compressor 102 runs at 100% capacity.

Cooling fan motor contactor M2 is connected in series with the start button 226, stop button 228, compressor motor contactor M1, and overload detection OL2 and is activated whenever compressor motor 214 is operating, as long as there is no overload of fan motor 216. Significantly, there is also a power line 232 from relay board 400 connected to overload detection OL2 and fan motor contactor M2, in parallel with the connection of start button 226, stop button 228, and compressor motor contactor M1. Thus, the circuit maintains power to fan motor contactor M2 whenever the contactor M1 contacts are closed. Preferably, the circuit maintains power to fan motor contactor M2 after the stop button is pushed or a shutdown command is received, until the system detects an actual shutdown of compressor motor 214. The inventors have found that if the compressor motor contactor becomes stuck in a closed condition, so that the motor continues to operate despite pressing of stop button 228 or issuance of an automatic shutdown command, there is a danger of overheating if fan motor 216 obeys the shutdown command. Thus, the system of the present invention is designed to maintain operation of cooling fan motor 216 through contactor M1 auxiliary contacts until shutdown of compressor motor 214 is accomplished by removal of the main power.

As shown in FIG. 2, power and relay connections 212 also include additional connections of relay board 400 to control solenoid valves SV1 through SV4 which actuate, respectively, the four lift valves of the compressor 102. Relay board 400 is also connected to actuate solenoid valve SV5 to unload the compressor, solenoid valve SV6 for blowdown, and solenoid valve SV7 for inlet air flow modulation.

In the embodiment shown, the control circuit is connected to control changeover of power connections to the compressor motor so that compressor motor 214 can be operated in a wye-delta configuration. Connector JP4 of the relay board is connected to a wye-delta switching circuit 234 that controls contactors M1, S, and M3 to selectively switch between wye and delta power connections for compressor motor 214. If wye-delta operation is not desired, the circuit could be modified to provide an across-the-line control and power configuration. In this alternative configuration (not shown in the drawing), wye-delta switching circuit 234 is eliminated and compressor motor 214 operates using only contactor M1, which connects the three power phases through overload protection OL1 to compressor motor 214. In this alternative configuration, no connections are made to connector JP4 of relay board 400. Timing relay TR2 is eliminated. Instead of being connected to control relay TR2 and to power hour meter HM, the connection of pin 6 of connector JP5 through normally closed contacts of relays CR2 and OL1 controls contactor M1 and powers hour meter HM, and has no connection to wye-delta switching circuit 234. Also, in the across-the-line configuration, relays S and M3 are eliminated and the connection of pin 8 of connector JP5 of relay board 400 passes through a normally open contact of contactor M1, rather than M3, to control solenoid valve SV5.

In another embodiment (not shown), it is possible to use a remote starter with compressor motor 214 by inserting a remote starter between the three phase power supply and compressor motor 214. In this embodiment, a control relay is provided to actuate the remote starter. The control relay is connected in place of contactor M1, in the same manner shown in FIG. 2 to provide a two-wire control of the remote starter.

Figure 3:
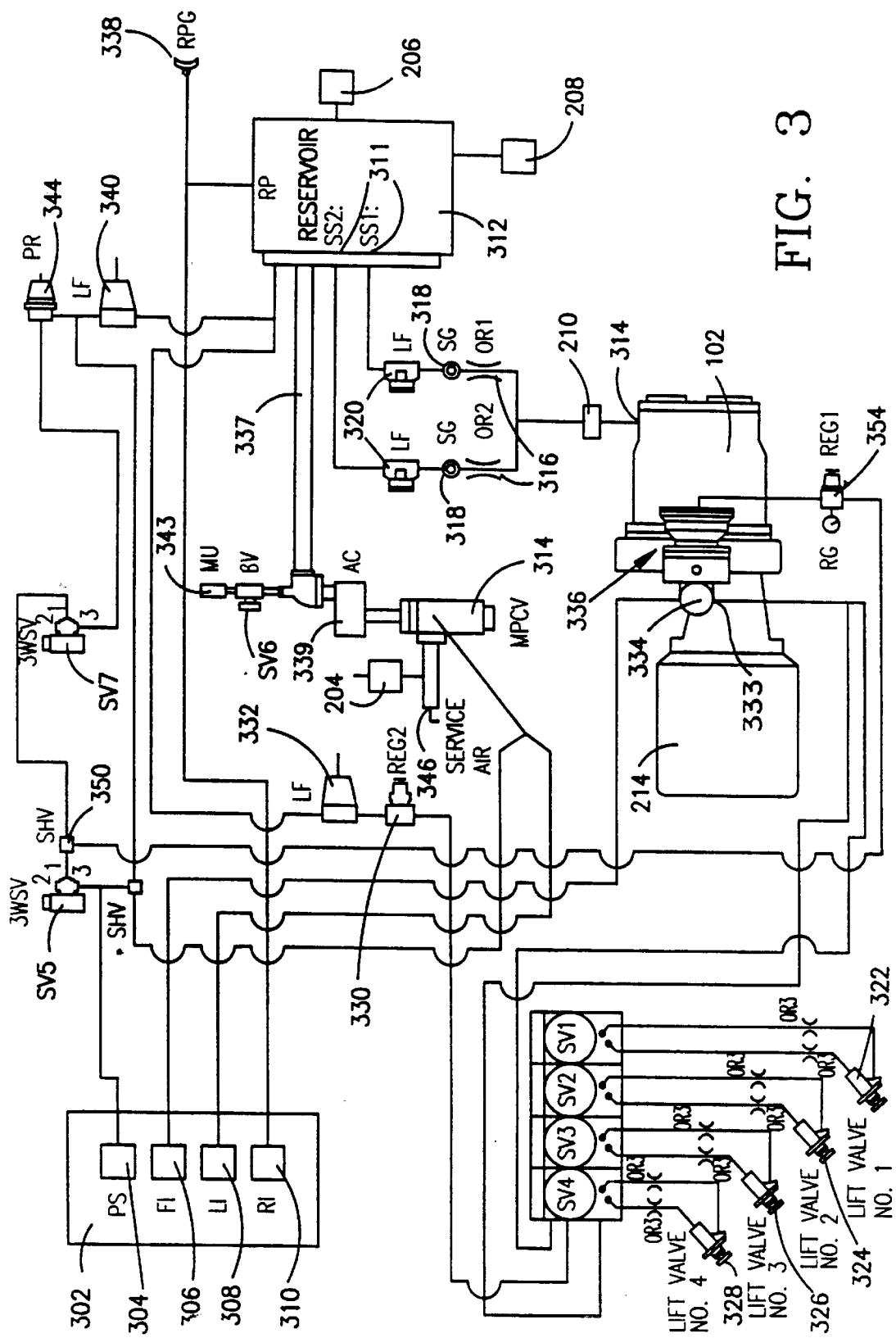
FIG. 3 is a block schematic diagram of the air control connections of the invention.

FIG. 3 is a block schematic diagram of air control line connections and air control equipment of a preferred embodiment of the invention. The air control equipment includes a control panel 302 having a pressure switch 304, an air filter delta pressure switch 306, a line pressure transducer 308, and a reservoir pressure transducer 310. Separator scavenges 311 of reservoir 312 are connected to air end discharge pressure point 314 of compressor 102 through line filter orifices 316, sight gauges 318, and line filters 320.

Four way solenoid valves SV1 through SV4 are connected to control lift valves 322, 324, 326, and 328 respectively. Valves SV1 through SV4 are preferably Parker 150 psi four-way positive action solenoid valves. An air supply input of valves SV1 through SV4 is connected to a pressurized air outlet of reservoir 312 by way of pressure regulator 330 and automatic line filter 332. Pressure regulator 330 may be omitted if compressor system 100 will not be operated above 125 psi full load pressure. Valves SV1 through SV4 are also connected by two lines to low pressure point 333 below air filter 334, on inlet valve 336 which is installed on the air intake port of compressor 102. These two lines provide exhaust ports for valves SV1 through SV4, for each direction of stroke of the valves.

Double action lift valves 322, 324, 326 and 328 are machined as an integral part of the rotor housing of compressor 102 so that the contour of the valve tops matches the contours of the rotor housing. In this way, there are no air passages around the rotor when the valves are closed.

The provision of double action lift valves 322, 324, 326, and 328, and their associated four-way control solenoid valves SV1, SV2, SV3, and SV4, rather than single action lift valves, provides a significant advantage in the context of compressor system 100. The double action valves provide positive opening and closing action, preventing valve sticking and erratic valve timing that may result from use of bypass valves that do not have positive action in both directions. This results in increased operating efficiency of compressor 102.

A reservoir air output 337 is connected to reservoir 312 to carry the compressed air output of the compressor to the customer's service air piping system, and thus to the equipment operating on the compressed air generated by compressor system 100. Air output 337 is connected through an aftercooler 339 to a minimum pressure check valve 341, the output of which is connected to the customer's service air piping system at service air output 346. Reservoir air output 337 is also connected to a solenoid operated blowdown valve SV6 which is connected to a muffler 343. When blowdown valve SV6 is actuated, air pressure in reservoir 312 is released to the environment through muffler 343.

A pressurized air outlet of reservoir 312 is connected by an air line to reservoir pressure transducer 310, and a mechanical pressure gauge 338 is connected to the same line next to reservoir 312. Similarly, a pressurized air output of reservoir 312 is connected to an input of automatic line filter 340. The output of automatic line filter 340 is connected to one air input side of shuttle valve 342 and to the input of pressure regulator 344. The output of pressure regulator 344 is connected to a non-common connection of three-way solenoid valve SV7. The other air input side of shuttle valve 342 is connected to the customer's service air at service air output 346 of compressor system 100.

The output of shuttle valve 342 is connected to pressure switch 304 and to a non-common connection of three-way solenoid valve SV5. The common connection of three-way solenoid valve SV5 is connected to one air input side of shuttle valve 350. The other air input side of shuttle valve 350 is connected to the common connection of three-way solenoid valve SV7. The remaining non-common connection of each of three-way solenoid valves SV5 and SV7 is open for exhaust. The output of shuttle valve 350 is connected by an air pipe to the input of gauge/pressure regulator 354. The output of gauge/pressure regulator 354 is connected to the inlet valve 336 control side.

These particular air connection configurations and the use of three-way valves SV5 and SV7 are significant because they allow inlet valve 336 to receive operating air pressure more quickly during startup, so that inlet valve 336 can be immediately closed to provide an unloaded startup of compressor 102. At startup, there is no pressure in reservoir 312. There may, however, be pressure in the customer's service air line, due to stored pressure in an external reservoir and/or because other compressors are running to pressurize the service air line. The inventors have determined that when service air pressure is available, it is advantageous to make use of this pressure for startup control during the period before reservoir 312 is pressurized.

At startup, the existence of pressure in the service air line and the lack of pressure in reservoir 312 will bias shuttle valve 342 to connect the service air line to three-way solenoid valve SV5. Three-way solenoid valve SV5 is then actuated to transmit the service air pressure to shuttle valve 350, while three-way solenoid valve SV7 is controlled to connect its common connection to the exhaust end. The service air pressure biases shuttle valve 350 to connect the service air pressure to control inlet valve 336. Valve SV5 is then actuated, which will unload compressor 102 prior to starting motor 214. In this way, compressor system 100 can be started without any loading, minimizing startup power usage and transient currents. When sufficient pressure is available in reservoir 312, air from reservoir 312 is provided to bias shuttle valve 342 toward three-way solenoid valve SV5, allowing transmission of the reservoir air to the inlet valve 336 control side.

Figure 4A:
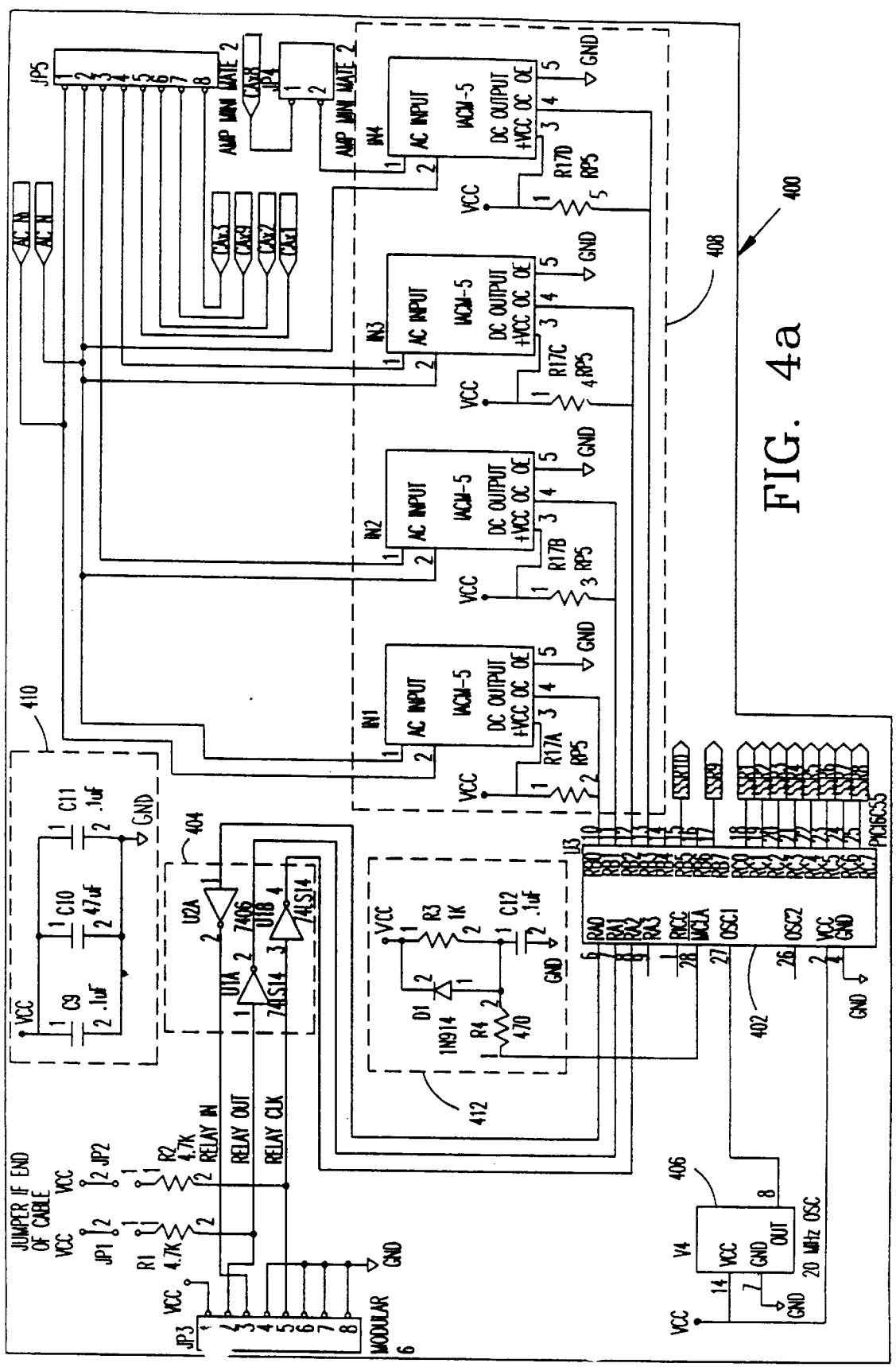
FIG. 4a and 4b are a schematic diagram of the relay board used in the electronic control system of the present invention.
Figure 4B:
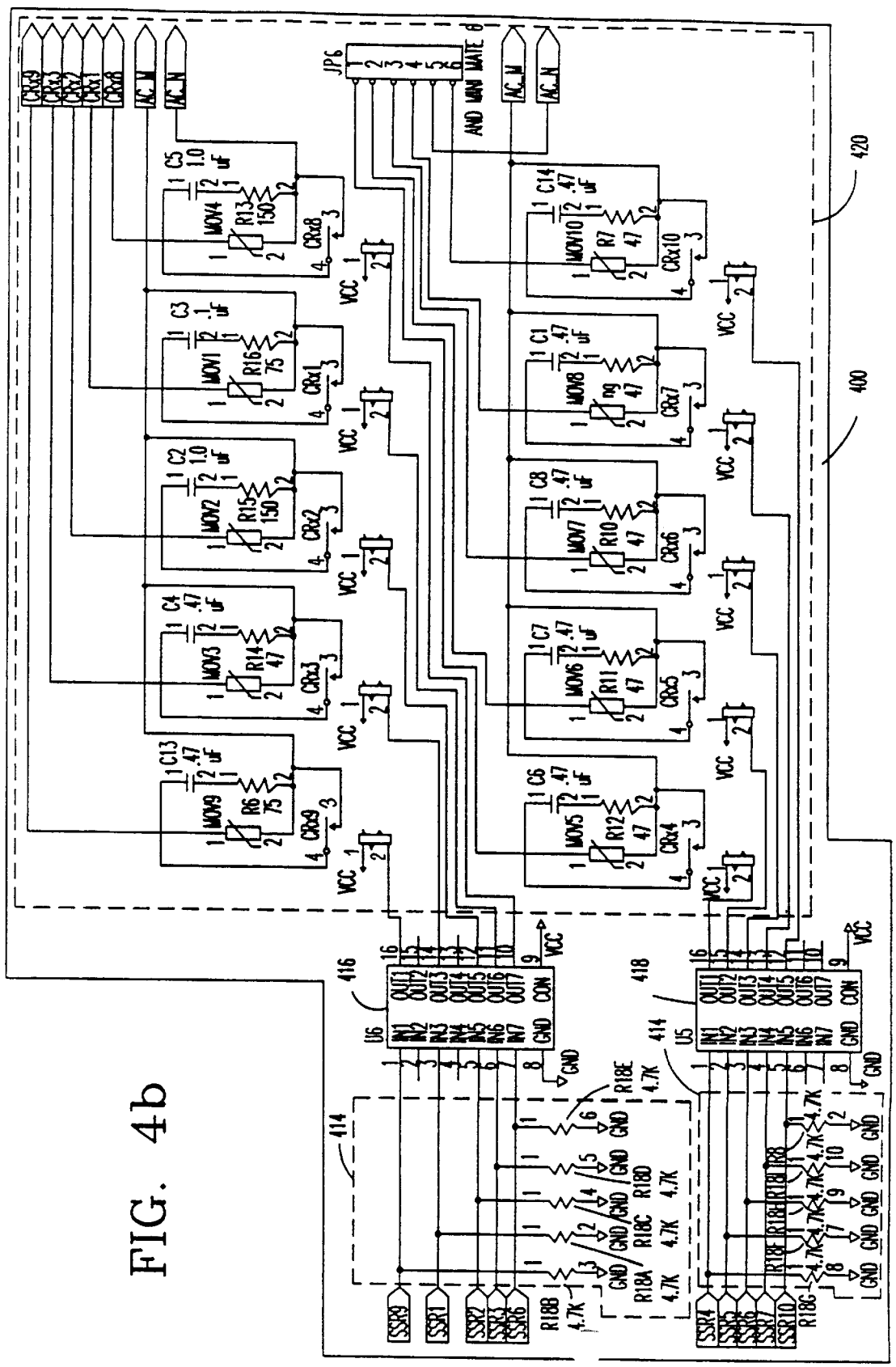

FIG. 4, consisting of FIGS. 4a and 4b, is a schematic diagram of the relay circuits used in electronic control system 104. These circuits may be implemented on a printed circuit relay board 400 (shown in FIGS. 4a and 4b) for installation in a power relay box associated with the compressor containing the compressor's power switchgear. Referring now to FIG. 4a, a serial communications processor 402 is provided on relay board 400. Serial communications processor 402 may be a PIC16C57/HS/P microcontroller manufactured by Microchip. Processor 402 is connected to and clocked by a 20 Mhz oscillator 406. A conventional 5VDC power source Vcc (not shown in schematic detail) is provided through the serial communications cable and connector JP3 for serial communications processor 402 and other elements on relay board 400. A capacitor array 410 and a protective diode circuit 412 are connected between Vcc and ground.

Serial communications processor 402 is connected through buffers 404 to connector JP3, which is connected through a cable to the microprocessor board of the present invention (described in detail below with reference to FIG. 5). Pins 2, 3, and 5 of connector JP3 are used to carry serial data in a TTL LOGIC DRIVE arrangement. Pins 4 and 6–8 of connector JP3 are grounded and pin 1 is connected to Vcc.

Four input/output ports of processor 402, RB0 through RB3, are connected to the DC outputs of input modules 408 (IN1 through IN4). Input modules 408 are connected to sense the presence of AC current at specified points in the system and provide a digital signal indicating the presence or absence of current. Processor 402 conveys information about these sensed signals to the microprocessor board, which may take control action based on the sensed signals. For example, in the preferred embodiment, input modules 408 may be connected to sense power applied by a system start button, presence of AC power overload, engagement of the motor contactor, and shorting of the motor contactor, respectively, and processor 402 transmits status information derived from these sensed signals to the microprocessor board. Input modules 408 are connected to elements of compressor system 100 external to relay board 400 by connectors JP4 and JP5.

Ten additional output ports of processor 402, labeled SSR1 through SSR10 in FIG. 4a, are connected to additional components on relay board 400. FIG. 4b shows the connections of these ten ports in more detail. As shown in FIG. 4b, each of the ports SSR1 through SSR10 is connected to ground by one of the 4.7KΩ pulldown resistors 414. SSR1–SSR10 are further connected to respective inputs of integrated circuit drivers 416 and 418. The outputs of drivers 416 and 418 corresponding to SSA1 through SSA10 are connected individually to ten 5VDC actuated AC power relays 420. Each relay is protected by a snubber circuit consisting of a resistor and capacitor in series across the power terminals of the relay. In parallel with the snubber circuit, there is also a metal oxide varistor to protect against power surges. One of the power terminals of each relay 420 is connected to either an AC hot or AC neutral line. The other power terminal of each relay is connected to other components of system 100 through connectors JP4, JP5, and JP6.

FIG. 5, consisting of FIGS. 5a through 5i, is a schematic diagram of microprocessor board 500, described generally above with reference to FIG. 2. Microprocessor board 500 contains a special purpose computing system for controlling system 100.

Figure 5A:
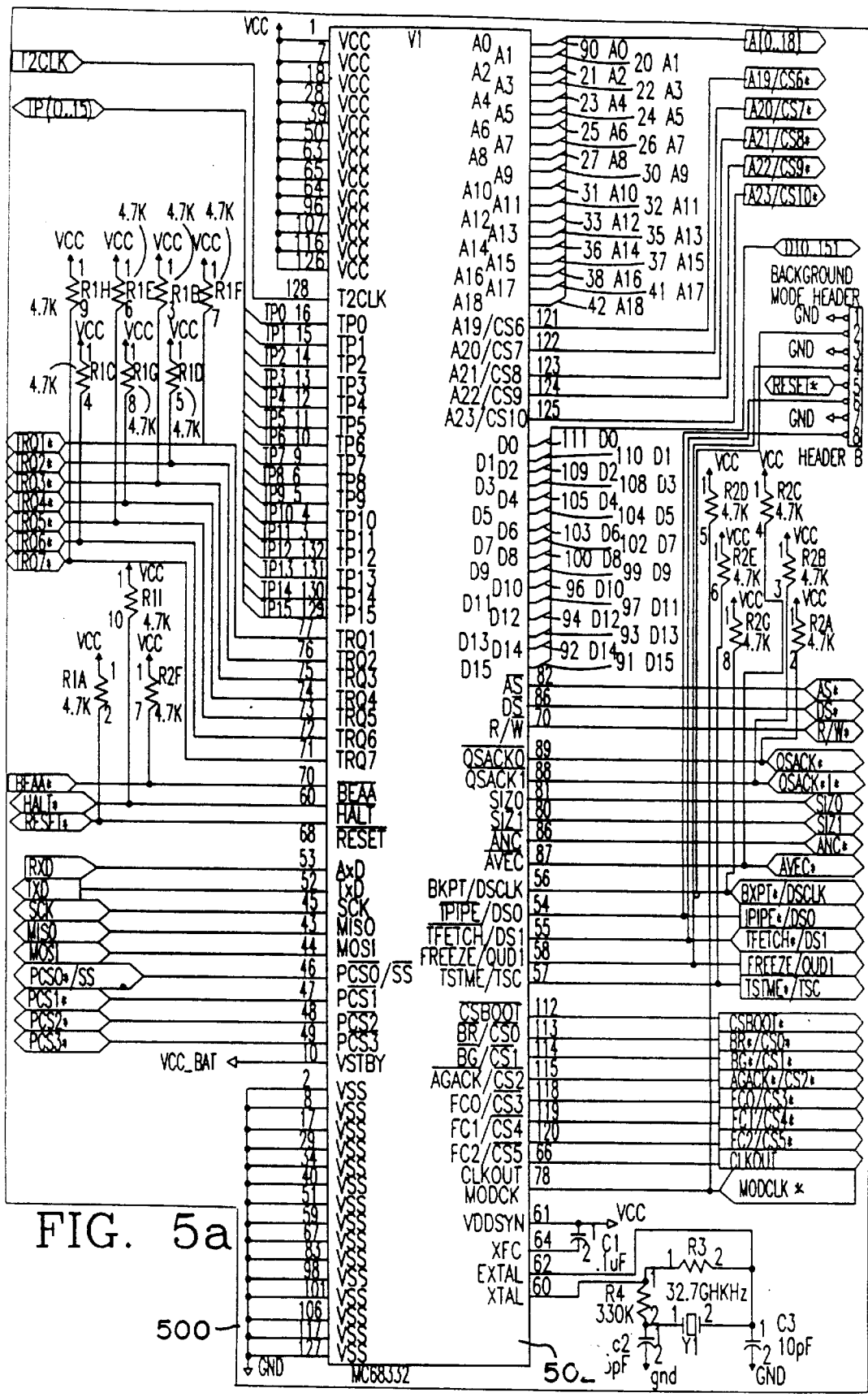
FIG. 5a through 5i are a schematic diagram of the microprocessor board used in the inventive electronic control system.

FIG. 5a shows the system processor 502, which is the main processing device for electronic control system 104. System processor 502 is a digital processor with input/output ports capable of running a program stored in firmware to monitor compressor system operation and generate appropriate control signals to control the compressor system. In the preferred embodiment shown, system processor 502 is an MC68332 microcontroller manufactured by Motorola, Inc. of Schaumberg, Ill. System processor 502 is connected to other components on microprocessor board 500 by a bus comprising address, data, and control lines. In FIGS. 5a through 5i, like designations of lines on different sheets are used to indicate a connection between the identically designated terminals.

Figure 5B:
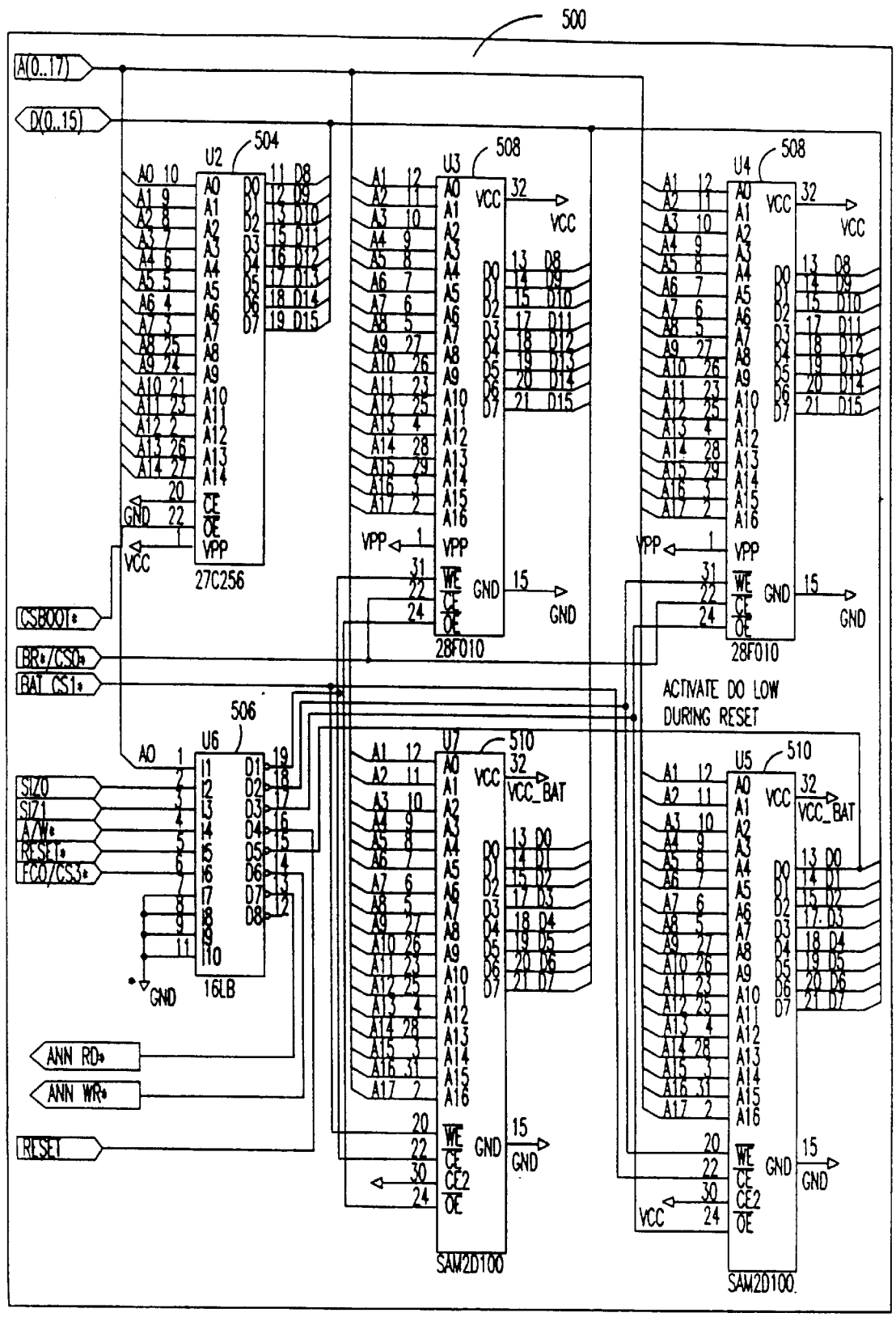

FIG. 5b shows connections of integrated memory circuits connected to system processor 502 by the bus. A boot ROM 504 contains firmware instructions for initializing system processor 502 and its connected components. Boot ROM 504 may be an AM27C256-150DC 150 nanosecond CMOS EPROM read only memory manufactured by AMD. An address decoding integrated circuit 506, which may be a model number PEEL 18CV8P-15 chip, is connected to generate and transmit addressing signals to two firmware storage chips 508 and two random access memory chips 510. Preferably, firmware storage chips 508 are flash-upgradable memories to allow updating of the system operating firmware. Firmware updates may be transmitted from a remotely located station at the system manufacturer or a maintenance center, if system 100 is equipped with modem 211 as described previously. Firmware storage chips 508 may be AT 29C010-12PC 120K×8 flash EEPROMs with 120 nanosecond access time. Random access memory chips 510 are preferably SRM20100LC100 low power 128K×8 static RAM integrated circuits with 100 ns access time, which provide more memory than is used in the present embodiment, leaving room for future expansion of system functions. If desired, 32K×8 RAM chips may be substituted, as a lesser amount of memory is sufficient for operation of the embodiment disclosed herein.

Random access memory chips 510 are used for storage of operating data, history data, sequence and schedule data for network multiple machine control, and intermediate calculating results during operation of electronic control system 104. Operating firmware implementing the features described in this specification is stored in boot ROM 504 and firmware storage chips 508. Detailed flowcharts and documented source code for a preferred embodiment of this firmware is provided in the microfiche appendix which is part of this specification. Upon reviewing the source code and flowcharts in the microfiche appendix, in conjunction with the description and drawing figures in the main part of the specification, those skilled in the art will fully understand the features and operating characteristics of the present invention.

Figure 5C:
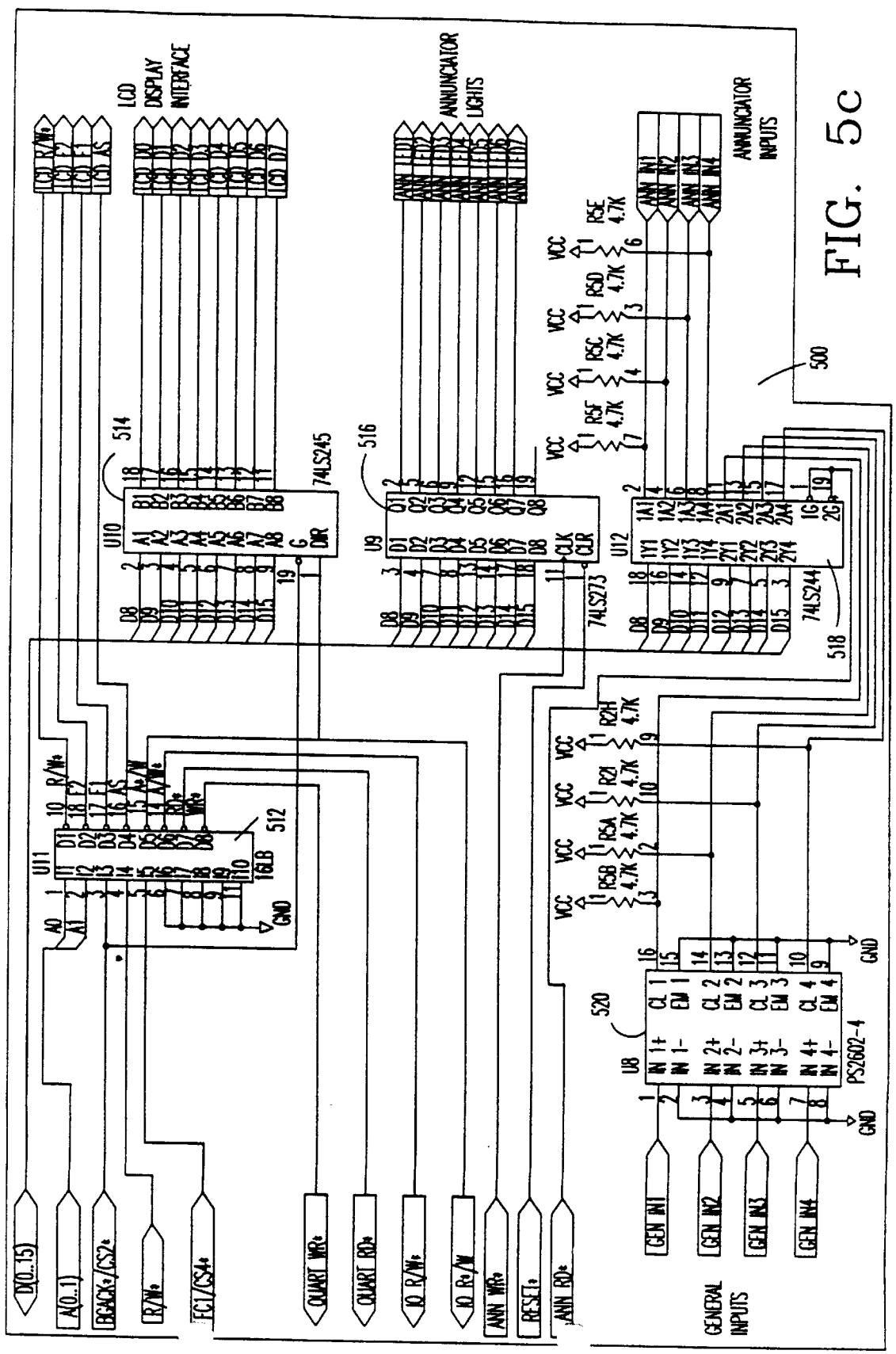

FIG. 5c shows additional decoding and driver circuitry of microprocessor board 500 providing an interface to annunciator board 600 and display board 202. Address decoding chip 512 (which may be a PEEL 18CV8P-15) generates addressing signals for the liquid crystal display interface. A gating chip 514 (which may be a SN74LS245N) selectively transmits data to the LCD interface under the control of system processor 502. Driving circuit 516 (which may be a T74LS273-B1) is connected to selectively transmit driving signals for the annunciator LEDs which are described in more detail below with reference to FIG. 6.

Input processing chip 518 (which may be a model number SN74LS244N chip) receives information inputs from annunciator board 600 and makes the input information available in digital form to system processor 502. Specifically, input processing chip 518 is connected to receive the status of the annunciator board inputs, including lamp test button 224, air cleaner vacuum switch 222, and oil filter delta pressure switch 220 (all shown in FIG. 2). Input processing chip 518 is also connected to receive and forward the status of four general inputs transmitted through optical isolator 520, which may be a model number PS2502-4 integrated circuit manufactured by NEC. The general inputs are not connected in this embodiment, but are provided to permit future expansion.

Figure 5D:
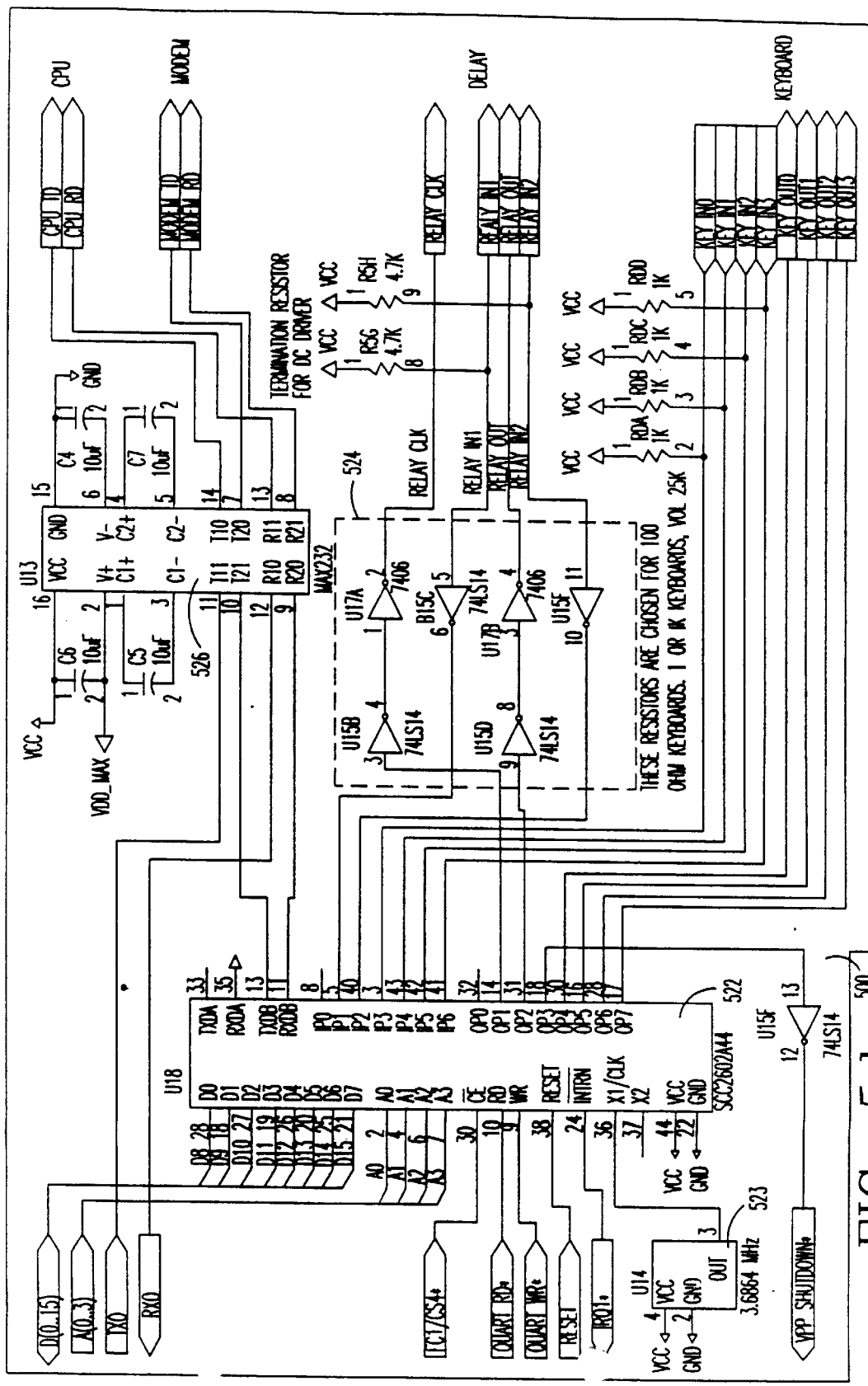

FIG. 5d shows serial data transmission and polling circuitry on microprocessor board 500 associated with system processor 502. A dual universal asynchronous receiver transmitter (DUART) 522 is connected via the bus to system processor 502. DUART 522 is connected to an associated 3.6864 Mhz oscillator 523. DUART 522 is also connected to keyboard input and output lines which are used to poll operator keyswitches, as described in more detail below with reference to FIG. 7, which shows the polled switches.

DUART 522 is further connected, through inverter and driver circuits 524 (comprising a 74LS14 chip and a 7406 chip) to transmit and receive serial data communications between microprocessor board 500 and processor 402 of relay board 400. Finally, an RS232 conditioning circuit 526 (which may be a MAX 232CPE chip) connects DUART 522 to receive and transmit lines of modem 211 (shown in FIG. 2) to facilitate serial data communication by the system with computers at different locations from that of system 100. RS232 conditioning circuit 526 also connects DUART 522 to receive and transmit lines CPU_TD and CPU_RD of a local RS232 port to facilitate communications with a directly attached computer for diagnostic, repair, and/or operation monitoring purposes.

Figure 5E:
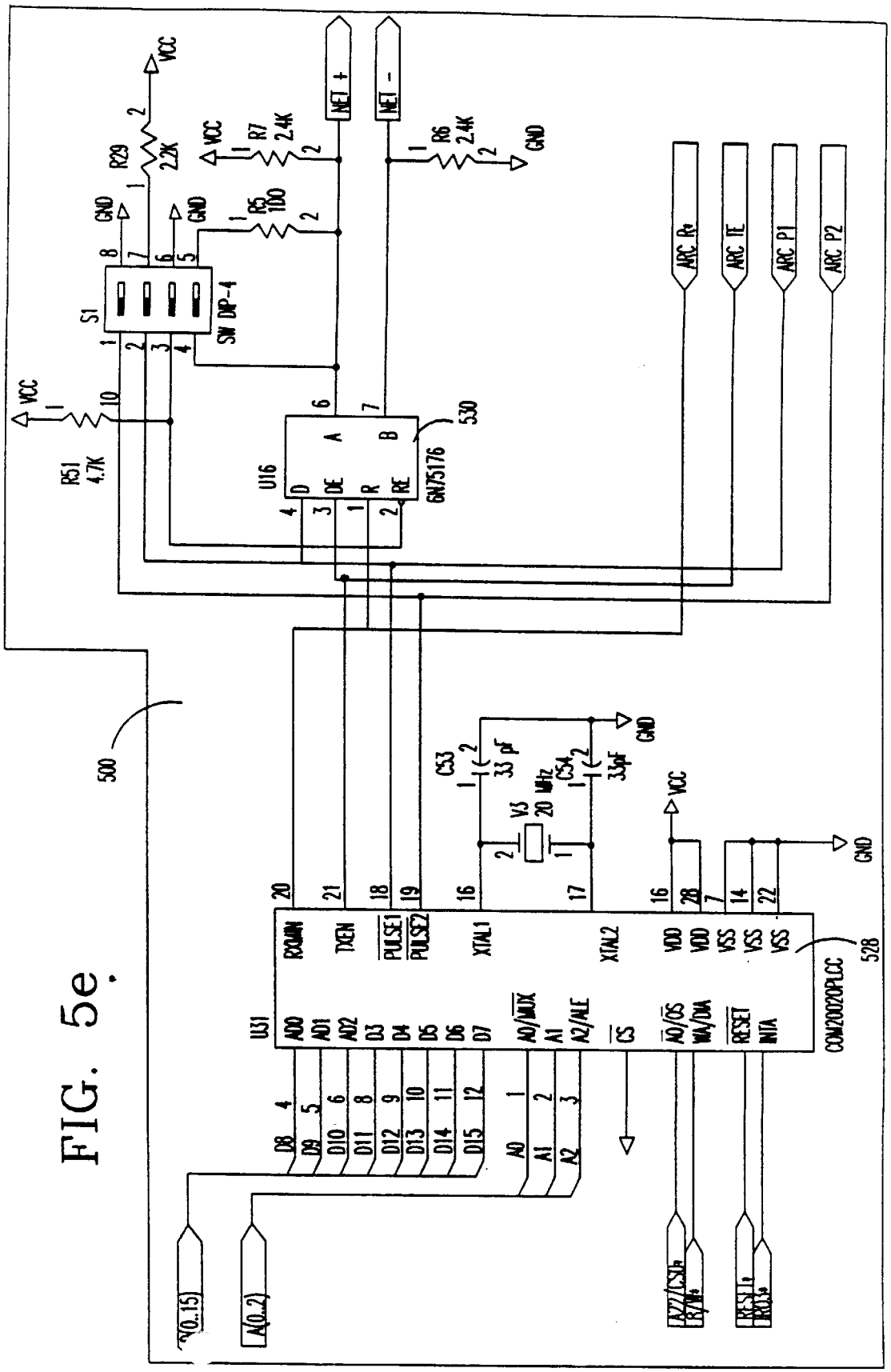

FIG. 5e shows the ARCnet communications interface circuits which are connected to system processor 502 and mounted on microprocessor board 500. A standard ARCnet interface is provided by ARCnet interface circuit 528 (which may be a COM20020LJP ARCnet controller), together with RS485 interface circuit 530 (which may be a SN75176AP RD422/485 transmitter/receiver). This interface is connected to network connection 213 (shown in FIG. 2) to allow ARCnet peer-to-peer communication among a plurality of machines equipped with electronic control system 104.

Figure 5F:
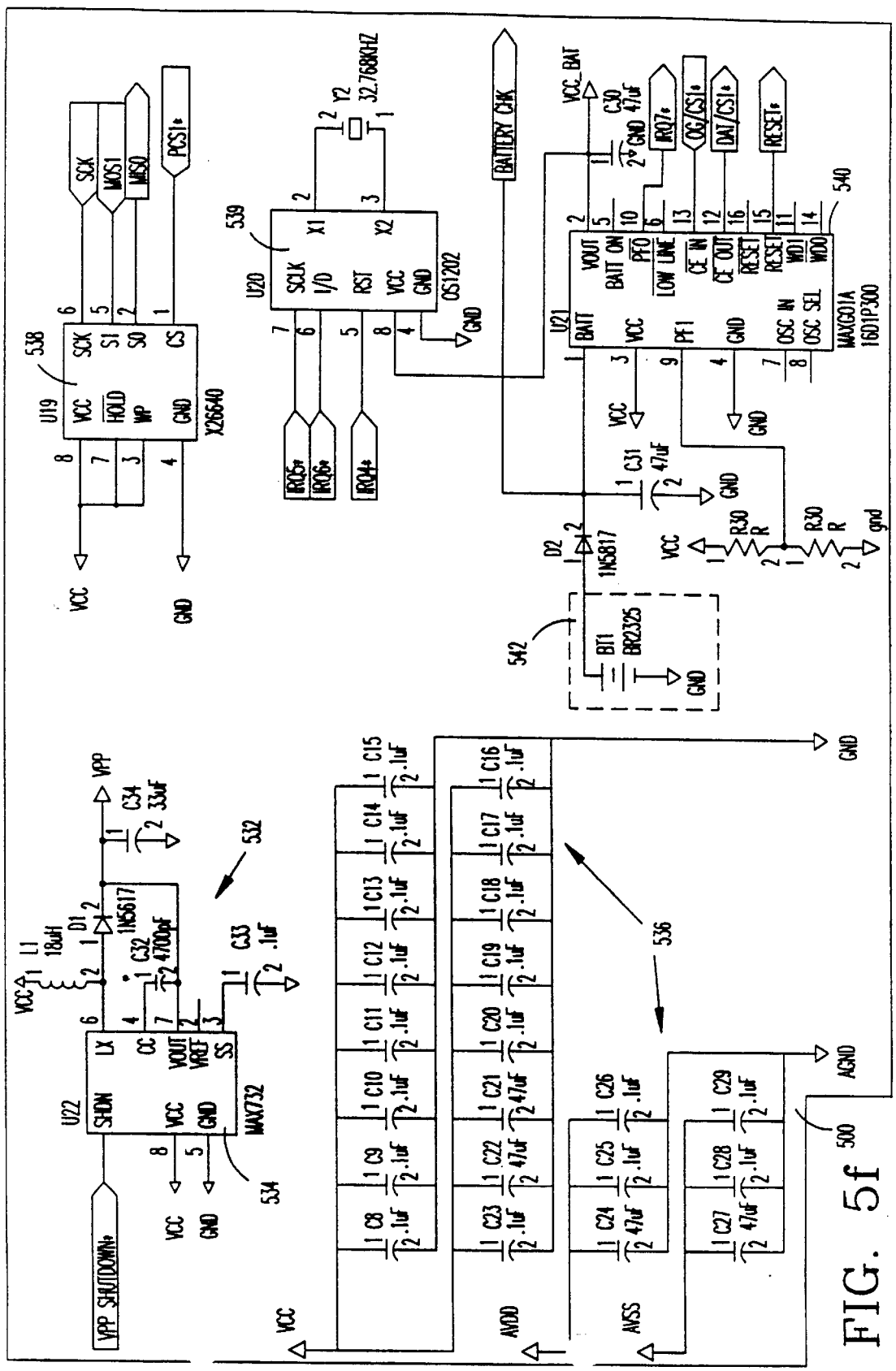

FIG. 5f shows power and information backup circuits for microprocessor board 500. Voltage generator circuit 532 generates a 15VDC voltage Vpp which could be used for programming flash memory firmware storage chips 508 (shown in FIG. 5b) if the chips used require this programming voltage. Voltage generator circuit 532 is based on an integrated circuit 534, Maxim part number MAX 732. Capacitor arrays 536 are connected to minimize transients in Vcc, AVdd, and Vss which are supply voltages used in the system.

An EEPROM 538 provides non-volatile storage for system status information, all operating parameters, the system serial number, configuration information such as available memory size. Significantly, EEPROM 538 may be used to store transducer offset values, configuration information, and default parameter values including pressure setpoints and activation windows. In addition, upon system shutdown due to a detected fault, EEPROM 538 can be used to store system status information, along with date and time information. This information can then be retrieved to help pinpoint the exact time and cause of a shutdown or failure. Preferably, critical information on the last fifteen shutdowns is stored in EEPROM 538. A complete memory address list for EEPROM 538, specifying the information stored in EEPROM 538, is provided in module EEPROM.C of the microfiche appendix.

Preferably, all of this information can be retrieved via modem 211 by a maintenance technician at a remote location, to aid in diagnosis of the problem and to ensure that the proper service parts are brought along if a service trip is required. EEPROM 538 may be a X25040P integrated circuit 8-bit serial EEPROM.

A real time clock 539, which may be a DS1202 integrated circuit, is connected to system processor 502 Supervisory circuit 540 monitors voltages in the system and applies backup battery power from a battery 542 to real time clock 539 and random access memory (such as random access RAM chips 510 shown in FIG. 5b) if the power supply fails to maintain adequate voltage. Supervisory circuit 540 is preferably a Maxim MAX 691 ACPE integrated circuit.

Figure 5G:
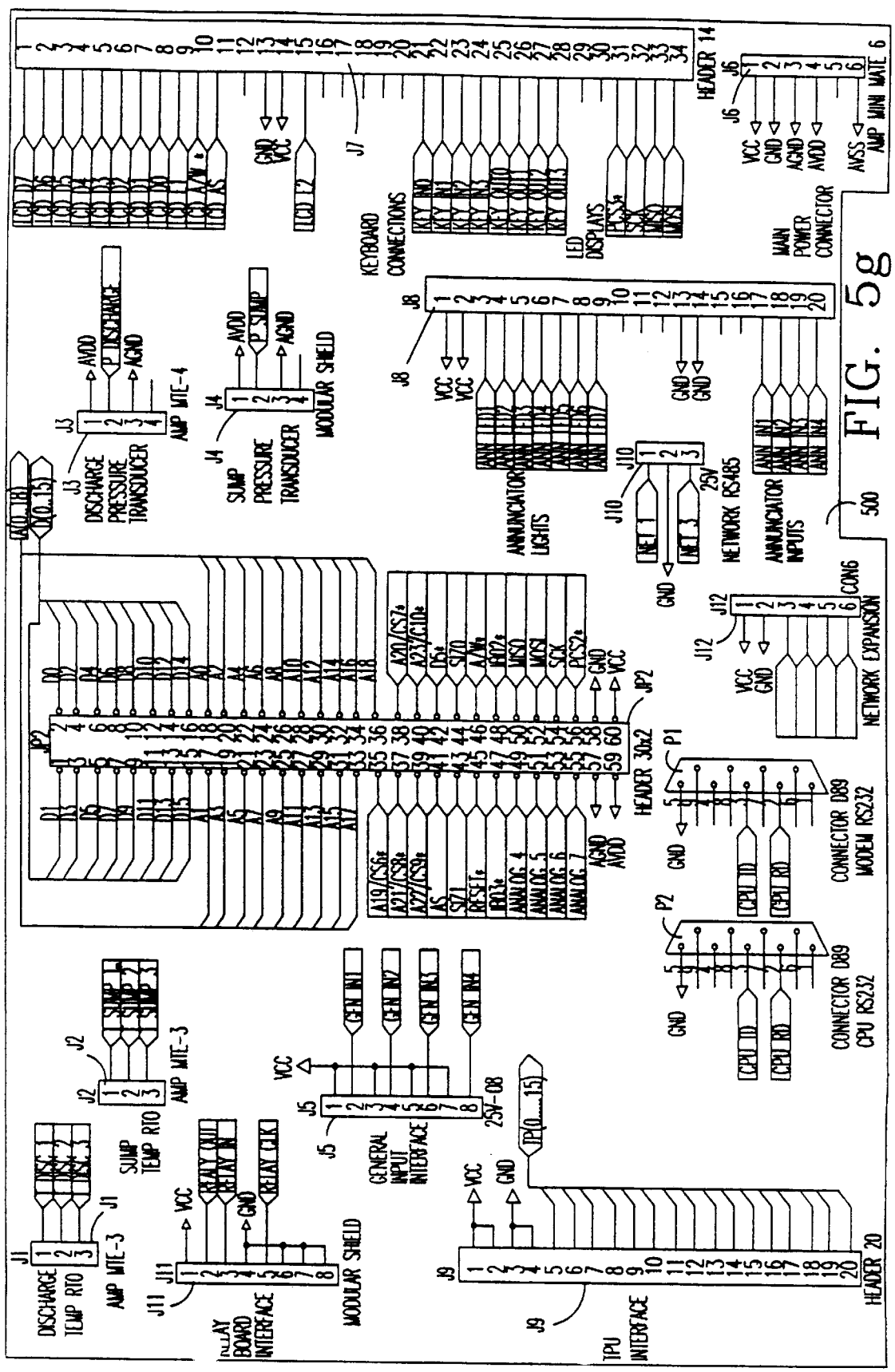

FIG. 5g shows the connectors provided for connecting the circuits of microprocessor board 500 to other components in electronic control system 104. As shown in FIG. 5g, a connector J1 provides connections for discharge temperature transducer 210. Connector J2 provides connections for sump temperature transducer 208. Connector J3 provides connections for line pressure transducer 204. Connector J4 provides connections for sump pressure transducer 206. Connector J11 provides an interface to relay board 400, as described previously with reference to FIG. 2. Connector J5 provides connections for future expansion of input devices (general inputs 1–4) as described above. Connector J9 provides connections for a time processor unit interface useful for development and diagnostics, and also possibly for time-related control enhancements. The various bus lines of microprocessor board 500 are connected to pins of a header JP2 which makes possible the connection of additional expansion card to the bus of microprocessor board 500.

A connector P2 is provided for local RS232 communications under control of system processor 502. Connector P1 is provided for connecting microprocessor board 500 to modem 211. Connector J10 is provided as part of network connection 213 (shown in FIG. 2) to allow two-wire ARCnet communications, and a network expansion connector J12 can be optionally activated for network operation using an enhanced network communications protocol or a fiber optic interface.

Connector J7 provides connections to display board 202. The connection of display board 202 will be described in more detail later, with reference to FIG. 7. Connector J6 provides power connections for microprocessor board 500 to power supply 218 (shown in FIG. 2). The power lines provided include Vcc (+5VDC), AVdd (+12VDC), AVss (−12VDC), as well as ground and Agnd (both zero VDC). Connector J8 provides connections of microprocessor board 500 to annunciator board 600, which will be described in more detail later, with reference to FIG. 6.

Figure 5H:
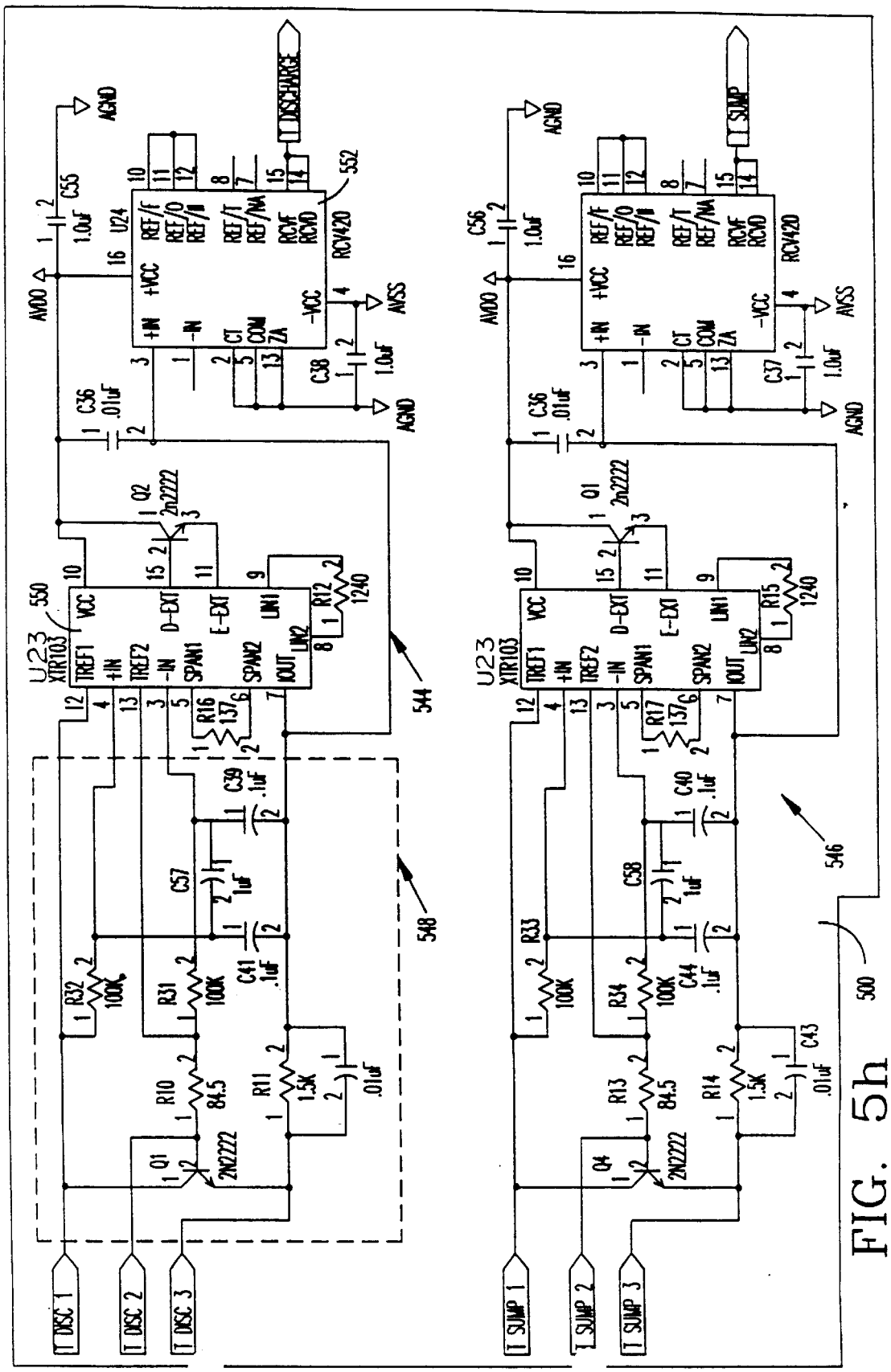
Figure 5I:
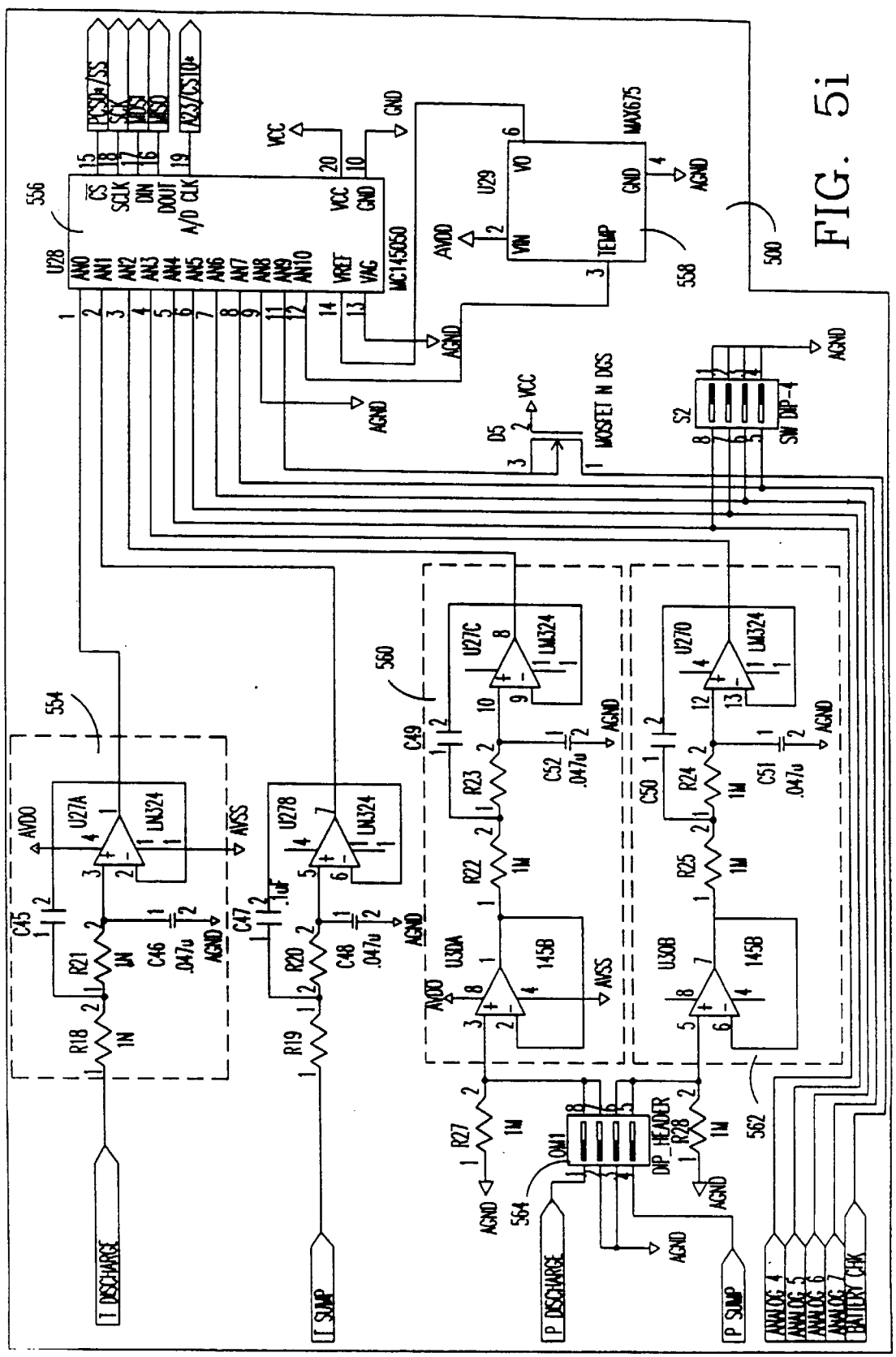

FIGS. 5h and 5i show conditioning circuits 546 and 544 provided for the resistance-type temperature devices associated with the system, that is, sump temperature transducer 208 and discharge temperature transducer 210 respectively. Persons knowledgeable about resistance temperature devices will appreciate that the design of these conditioning circuits may be varied depending on the characteristics of the resistance temperature device to be used. In the preferred embodiment, sump temperature transducer 208 and discharge temperature transducer 210 are each 100 ohm platinum resistance temperature sensors made by Minco. The operation and components of conditioning circuit 544 will be described in detail. As conditioning circuit 546 is substantially identical to conditioning circuit 544 in view of the use of the same resistance temperature device in both applications, only one detailed description of the conditioning circuits will be provided.

Referring to FIG. 5h, discharge temperature transducer 210 is connected to connector J1 (shown in FIG. 5g) and thus to conditioning circuit 544. Resistance temperature device transmitter 550, which is a part number XTR103AP integrated circuit, generates driving signals for the resistance temperature device and transmits these signals through RC network 548 to the two inputs of discharge temperature transducer 210, labeled T_DISC_1 and T_DISC_2. The resulting output of discharge temperature transducer 210, labeled T_DISC_3 in the drawing, is a 4–20 ma signal and is connected to RTD receiver 552. RC Network 548 filters out any radio frequency interference in the signals from the resistance temperature device. RTD receiver 552 (which may be a RCV420KP integrated circuit) converts the current signal of T_DISC_3 to a 0–5VDC voltage signal.

Circuitry in RC network 548 also provides a method of detecting whether the associated resistance temperature device (in this case, discharge temperature transducer 210) is disconnected. This is accomplished using transistor Q1, which is biased so that if there is no resistance sensed from discharge temperature transducer 210, a signal indicating an exceptional temperature, outside the possible operating range, is conveyed to RTD receiver 552. If discharge temperature transducer 210 is entirely disconnected, a signal indicating a particularly high temperature, such as 263° F. is transmitted. If one terminal of discharge temperature transducer 210 is disconnected, then a signal indicating either an exceptionally high or exceptionally low temperature, e.g. 0° F. is transmitted, depending on which terminal is not connected. System processor 502, upon receiving an indication of a temperature which is outside the reasonably expected operating range (more than 230° F. or less than 0° F.), provides a major failure indication by displaying a message on display 702 identifying which transducer is faulty, and shutting down compressor 102.

Referring now to FIG. 5i, the output T_DISCHARGE of RTD receiver 552 is then low-pass filtered by filter circuit 554 and transmitted to an analog-to-digital converter 556 so that system processor 502 can digitally monitor the air discharge temperature of compressor 102. An identical filter circuit is also provided for the sump temperature signal, which is similarly transmitted to analog-to-digital converter 556. The analog-to-digital converter 556 obtains a precision 5VDC reference voltage from reference voltage generator circuit 558, which may be a Maxim MAX675CPA integrated circuit.

FIG. 5i also shows the connections of discharge pressure transducer 204 and sump pressure transducer 206 to analog-to-digital converter 556. These connections similarly make the pressure readings sensed by these sensors available to system processor 502 in digital form. As shown in FIG. 5i, the output of discharge pressure transducer 204 is transmitted through impedance matching and low pass filter circuit 560 to analog-to-digital converter 556, and the output of sump pressure transducer 206 is transmitted through impedance matching and low pass filter circuit 562 to analog-to-digital converter 556. DIP header switch 564 is provided to allow creation of resistor dividers at the inputs to impedance matching and low pass filter circuits 560 and 562, respectively. This is accomplished by changing the position of DIP switches 2 and 3, respectively, and has the desirable effect of compensating for varying output voltages that may be created by different models of pressure transducers. In this way, it is possible to design a single microprocessor board 500 to work with at least two types of pressure transducers having different standard output voltage levels.

Thus, microprocessor board 500 provides the main control and processing circuitry of electronic control system 104.

Figure 6:
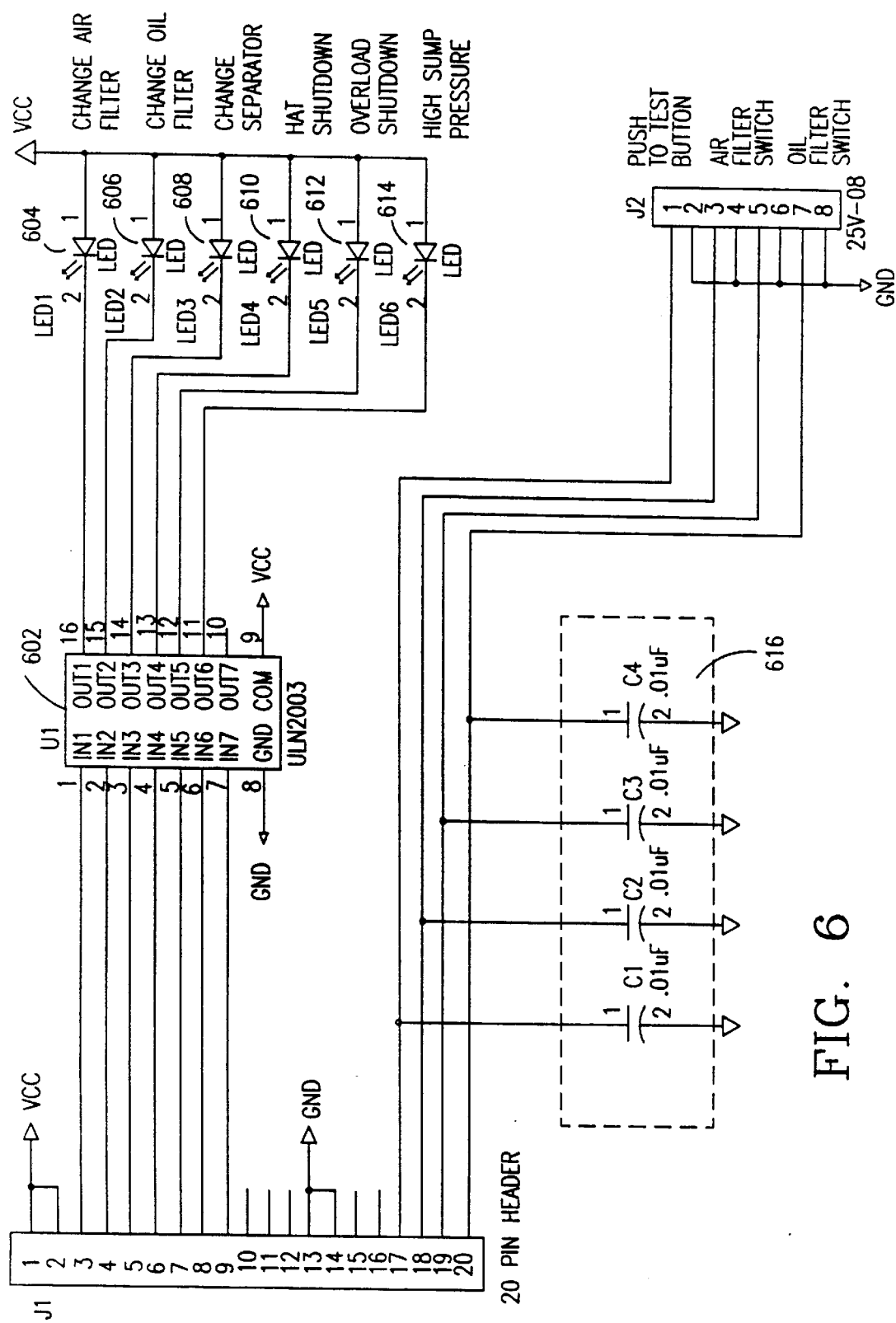
FIG. 6 is a schematic diagram of the annunciator board of the electronic control system.

FIG. 6 is a schematic diagram of annunciator board 600 of electronic control system 104. Annunciator board 600 is constructed on a printed circuit board and includes integrated circuit driver 602, change air filter LED 604, change oil filter LED 606, change separator LED 608, high air temperature shutdown indicator LED 610, overload shutdown indicator LED 612, high reservoir pressure LED 614, connectors J1 and J2, and filter capacitors 616.

Pins 3–9 of connector J1 are connected by an appropriate cable to connector J6 of microprocessor board 500, and are driven by output ports associated with system processor 502 to actuate the LEDs when appropriate. These pins on connector J1 are connected to inputs of integrated circuit driver 602 which provides increased power output capacity for driving the LEDs. The outputs of integrated circuit driver 602 are connected respectively to LEDs 604, 606, 608, 610, 612, and 614. Additional pins of connector J1 are connected to connector J2, and each line is connected to ground by one of the 0.01 uF capacitors 616. lamp test button 224, air cleaner vacuum switch 222, and oil filter delta pressure switch 220 (all shown in FIG. 2) are connected to connector J2.

Annunciator board 600 is installed in housing 236 so that LEDs 604, 606, 608, 610, 612, and 614 are visible from the outside of housing 236. The locations of the LEDs are preferably coordinated with a simplified pictorial schematic diagram of compressor system 100 applied to the outside of housing 236, so that each LED appears in the part of the system schematic most relevant to that LED. For example, overload shutdown LED 612 may be located in a schematic representation of the compressor motor. High air temperature shutdown LED 610 may be located in a schematic representation of the outlet pipe, and high reservoir pressure LED 614 may be located in a pictorial representation of the reservoir or sump. The filter and separator indicating LEDs may be located on pictorial representations of the lubricant filter, intake air filter, and air/lubricant separator, respectively.

Also, the colors of the LEDs are chosen to indicate the severity of the problem represented by lighting of that LED. Shutdown indicators, such as overload shutdown LED 612, high reservoir pressure LED 614, and high air temperature shutdown LED 610 are red. The remaining LEDs, whose function is to indicate a need for maintenance sometime soon, are yellow.

In operation, change air filter LED 604 is actuated when the output of air cleaner vacuum switch 222 shows an increased level of vacuum at the intake, indicating that the system's intake air filter 334 is becoming clogged. Change oil filter LED 606 is actuated when oil filter delta pressure switch 220 indicates a significant difference in pressure across the system's lubricant filter 108, indicating that lubricant filter 108 is becoming clogged. Change separator LED 608 is similarly activated when air/lubricant separator maintenance is needed. LED 608 is activated in response to detection of a significant increase in the difference between the reservoir pressure and discharge pressure (for example, 8 psi), as measured by reservoir temperature transducer 208 and discharge temperature transducer 210.

High air temperature shutdown indicator LED 610 is activated when discharge temperature transducer 210 (shown in FIGS. 2 and 3) indicates an excessive air temperature at air end discharge pressure point 314 of compressor 102, reflecting overheating of compressor 102. Overload shutdown indicator LED 612 is activated when an overload of compressor motor 214 is detected by overload detection OL1 (shown in FIG. 2), causing disconnection of power to compressor motor 214. High reservoir pressure LED 614 is actuated when excess pressure is detected in the sump or reservoir 312 by sump pressure transducer 206. Lamp test button 224 is actuated by an operator to test the operation of the LEDs. When lamp test button 224 is pressed, the resulting signal is transmitted to an input port associated with system processor 502 on microprocessor board 500, causing system processor 502 to briefly light all of the LEDs on annunciator board 600 and all segments of LEDs 708 and 710 on display board 202 (shown in FIG. 7).

Figure 7A:
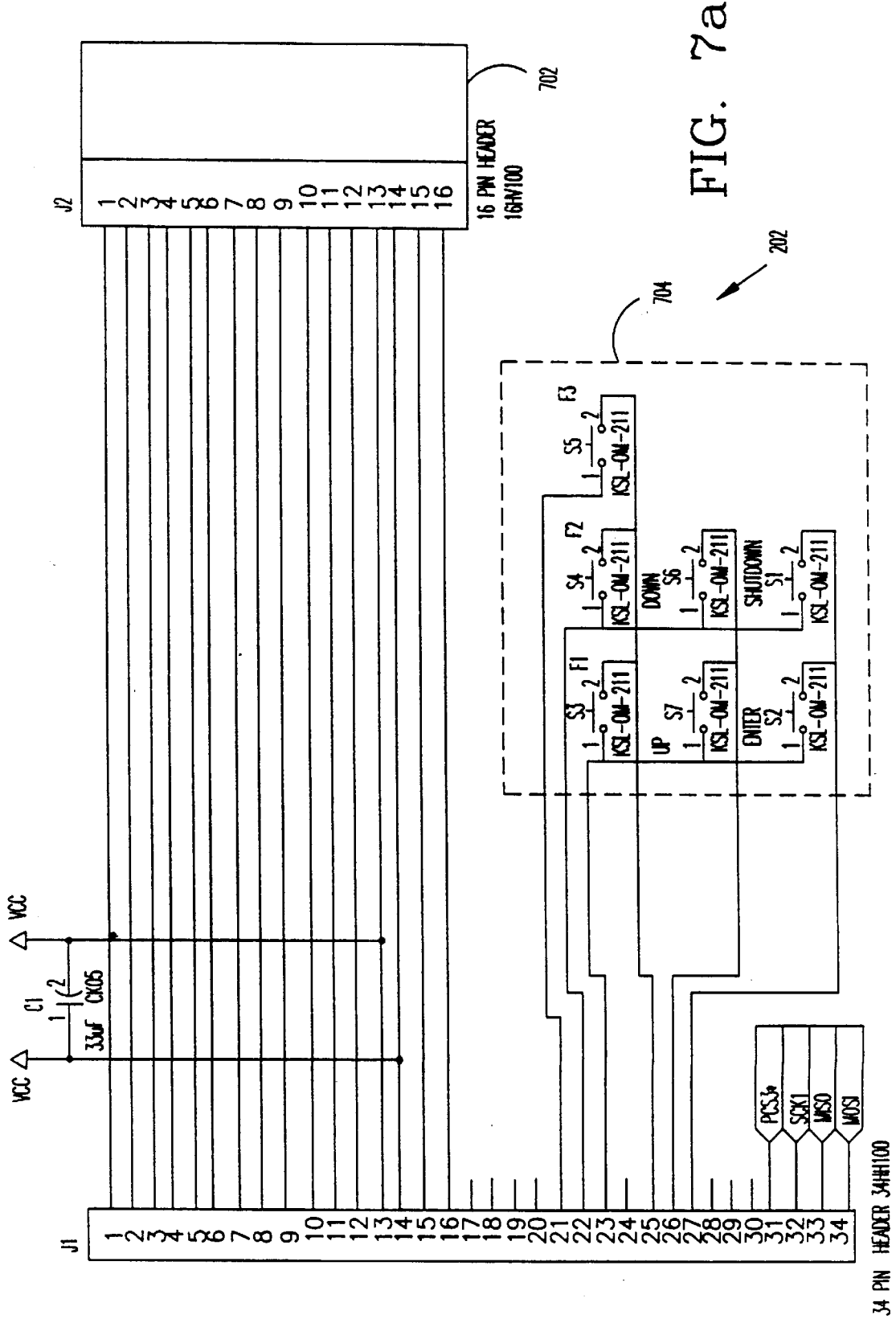
FIG. 7a and 7b are a schematic of the display board used in the invention.
Figure 7B:
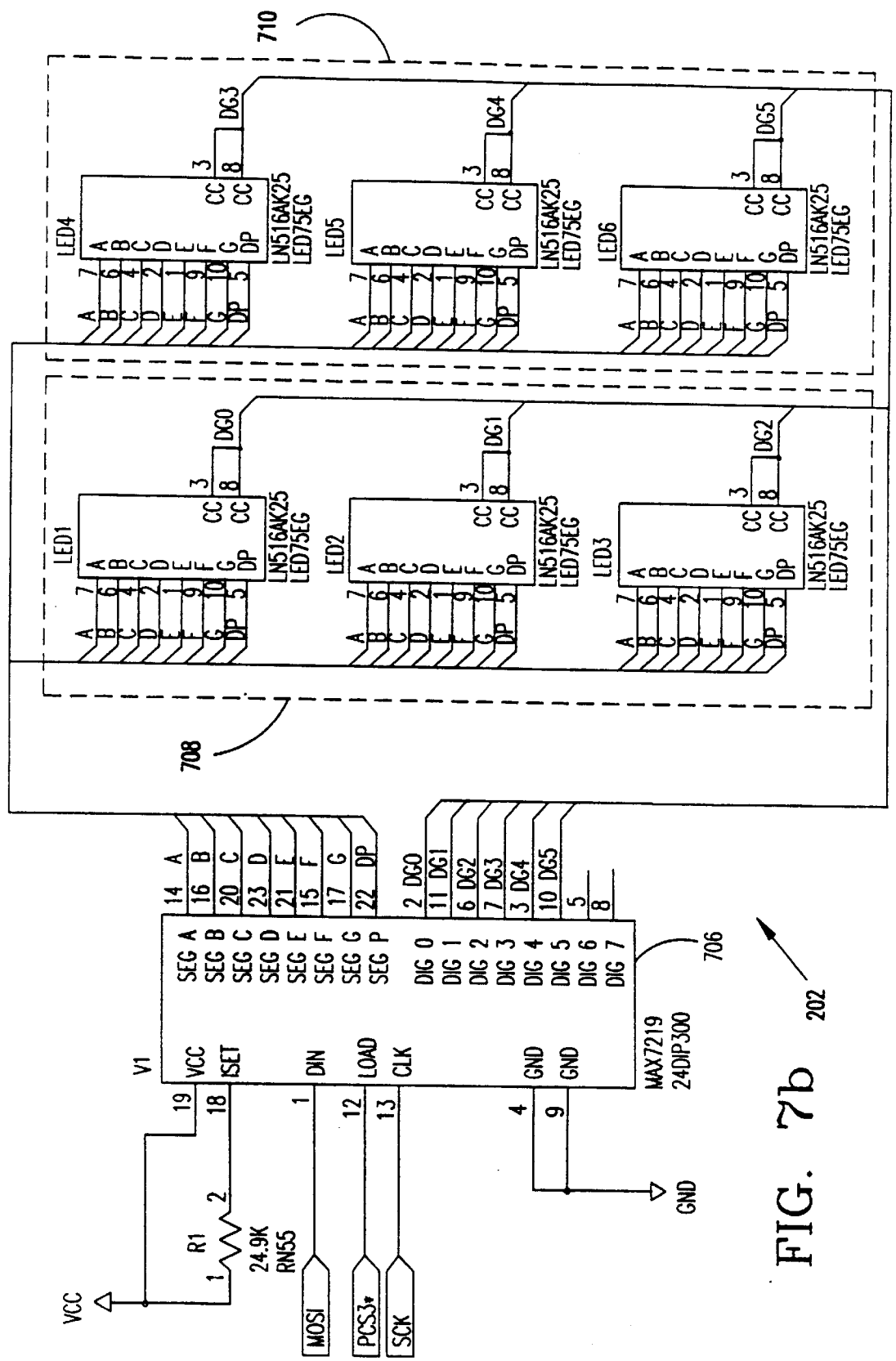

FIG. 7, consisting of FIGS. 7a and 7b, is a schematic diagram of display board 202. Referring first to FIG. 7a, this drawing shows 34-pin connector J1 which connects display board 202 to microprocessor board 500 (as shown in FIG. 2). Pins 1–16 of connector J1 are connected directly to pins 1–16 of header J2, which is connected to display 702. Display 702 is preferably a LM 1190-SGL 4-line by 40-character backlit liquid crystal display unit manufactured by Solomon. Pins 13 and 14 are connected to ground and 5VDC power, respectively, with a 33 uF filter capacitor connector between these power terminals.

A switch array 704, preferably including seven single pole, single throw miniature switches, is connected to pins of connector J1 in a matrix arrangement to allow polling of the seven switches by system processor 502. Switch array 704 is installed so that its switches are accessible from the front panel of housing 236 (shown in FIG. 2), and these switches are used by operators and maintenance personnel to control operation of the system and to select and store operating parameter values.

The seven switches are preferably assigned the following functions: up, down, enter, shutdown, and functions F1, F2, and F3. The shutdown button initiates an orderly programmed automatic shutdown sequence, in contrast to a shutdown initiated by pressing an emergency stop button which is also present in the system. This sequence will be described in more detail below with reference to FIG. 12. The enter button indicates that data entry is complete and causes the system to act on the data entered. Data is entered using the up and down buttons, which can be manipulated to increment and decrement system operating parameter values. The function keys F1, F2, and F3 have variable effects depending on the operating function being performed at the time. Typically, the firmware of the system microprocessor will provide menu driven operation and display 702 will display a menu indicating the functions performed by F1, F2 and F3 at any given time.

Pins 31–34 of connector J1 are connected to additional components of display board 202, which will be described with reference to FIG. 7b. As shown in FIG. 7b, appropriate pins of connector J1 are connected to allow system processor 502 to transmit serial data to control LED display driver 706. Display driver 706 may be a MAX 7219 CNG integrated circuit. Display driver 706 is connected to six seven-segment LED numeric digit displays, which are divided into two groups of three digits each: temperature display LEDs 708 and pressure display LEDs 710.

The inventors have found that it is desirable to constantly display, in an easily seen form, the compressor's output air pressure and output air temperature whenever the compressor is operating. The connection of LED display driver 706 and its associated LEDs to system processor 502 allows processor 502 to maintain a constant numeric display of temperature and pressure, freeing display 702 for other uses.

Figure 8:
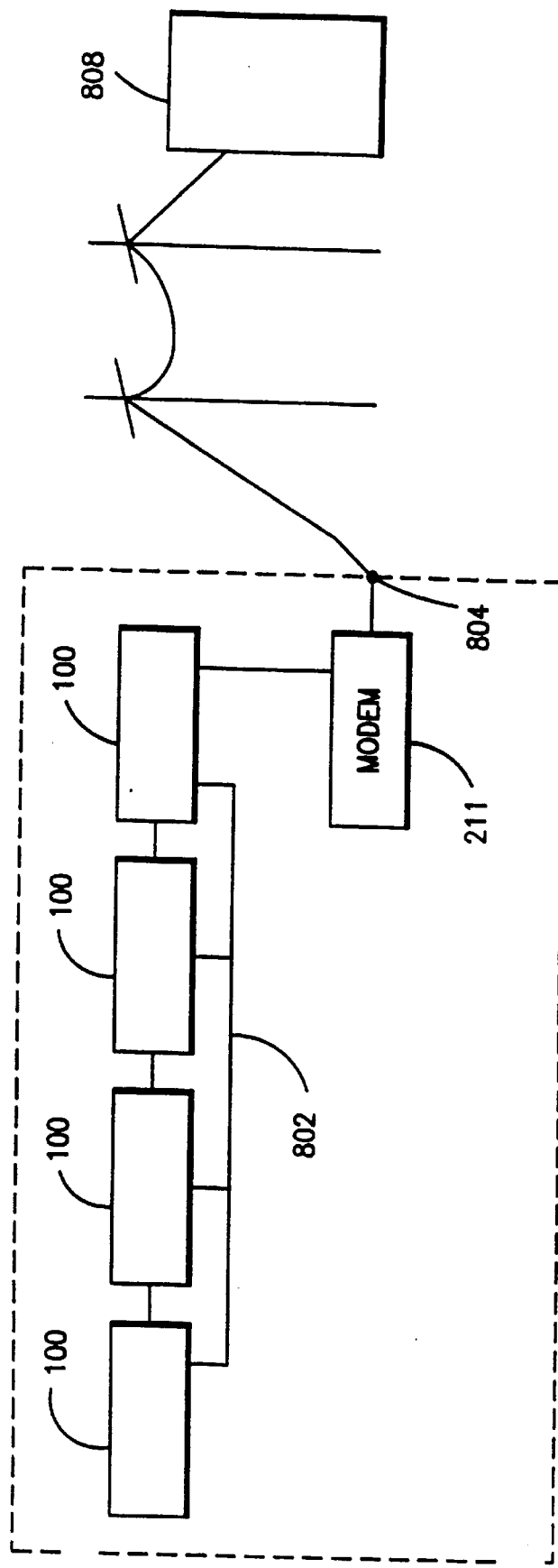
FIG. 8 is a block schematic diagram showing network and remote communications configurations using the compressor control system of the present invention.

FIG. 8 is a block schematic diagram showing network and remote communications configurations of compressor system 100. In FIG. 8, four compressor systems 100 are shown in a network configuration, connected by network wiring 802. Network wiring 802 connects compressor systems 100 in a multidrop configuration according to the EIA RS-485 standard and carries information between the compressor systems 100 using standard ARCnet protocol.

To permit remote monitoring and control of the network, one of the compressor systems 100 is connected to modem 211 which is connected to telephone jack 804. Telephone jack 804 is connected to telephone system 806 which provides a telephone line connection to remotely located personal computer 808. Modem 211 operates to transfer information to personal computer 808 and to receive commands and control signals from personal computer 808 in the manner described above with reference to FIG. 2. When a plurality of compressor systems 100 are connected in a network as shown, commands received via modem 211 by the compressor system 100 connected to modem 211 may be transmitted over the network to the other compressor systems 100 to provide remote control via modem of all functions of all the compressors in the network.

Modem 211 permits remote monitoring of compressor operation for diagnosing service problems, allowing a serviceman to be better prepared to fix the problem before leaving his shop. Remote monitoring and data retrieval can also be used for optimization of compressor control. Data is stored in electronic control system 104 and can be retrieved for fine tuning or evaluation of unload and load pressures, auto/dual timeout values, and multiple compressor configurations, the functions of which will be described later in more detail with reference to FIGS. 9–11. In addition, compressor parameters can be configured from the remote site. After examining the data transmitted by compressor system 100, the remote operator can adjust operating parameters for improved compressor operation. Finally, if any firmware problems are found in the field, the unique combination of this modem link and the flash memory provided in the present invention permits updating the system firmware immediately without any need for a service call. In addition, these features allow addition of special firmware options to the compressor as desired without an on-site visit.

Of course, the above-described uses of modem 211 are not limited to network operation, and a modem 211 can be provided on a standalone compressor system 100 to perform these same functions for a standalone system.

The operation of the control firmware on microprocessor board 500 provides significant advantages. While the operation of this firmware is described in complete detail in the flowcharts and documented source code in the microfiche appendix, selected operating features will be briefly described herein for the convenience of the reader.

One significant advantage of electronic control system 104 is the ability to regulate its pressure output in any of four pressure regulation operating modes, under control of an operator, depending on the requirements of the particular installation at the time. In addition, numerous other control features are available from the system's operating menus. For example, lift valve operation can be selectively disabled through a setup menu, or via a command received from a remote station through modem 211 and/or network connections of the system.

The first three operating modes are single-machine modes, wherein compressor system 100 operates substantially independently of any other compressors at the same location. The fourth operating mode is a networked machine operating mode, wherein compressor system 100 communicates with other compressors having the same electronic control system 104 and feeding the same service air system, and coordinates its operation with that of the other compressors to maintain a desired pressure in the service air system.

The single machine operating modes include a continuous run mode, an auto/dual control mode, and a target pressure mode. The operating mode is selected from a menu provided on display 702, by an operator using the control inputs of electronic control system 104.

In the Continuous Run mode, electronic control system 104 keeps compressor motor 214 running at a constant speed and uses an adjustable pressure deadband algorithm to match compressor output to system demand. This pressure band operation varies system operation based on dynamically calculated pressure ranges, rather than responding directly to the measured service air pressure value.

As the pressure rises above the full-load pressure setting, signals are sent to sequentially open valves SV1, SV2, SV3, and SV4 to return air to the suction housing prior to compression, thus controlling the effective length of the compressor rotor, and reducing the air delivery of compressor 102. If valves SV1, SV2, SV3, and SV4 have been opened and the measured service air pressure continues to rise, indicating that the system demand is less than 50% of the compressor capacity, electronic control system 104 operates in a load/unload control mode over this lower 50% of machine capacity. This is accomplished by cyclically actuating and deactuating unload valve SV5 to open and close inlet valve 336 with a duty cycle directly related to the system demand. As system demand is reduced, the percentage of time that inlet valve 336 is open is similarly reduced. If compressor 102 loads and unloads more than a predetermined number of times over a specified time period, for example 10 cycles in thirty seconds, electronic control system 104 switches from the load/unload mode to a modulation control mode to stabilize the system pressure. In the modulation control mode, solenoid valve SV7 is actuated to allow air to flow through the associated modulation valve to partially close inlet valve 336. If service air pressure rises to a point indicating there is no system demand, the control closes the positive closure inlet valve 336, unloading compressor 102, and activate blowdown valve SV6 to release pressure in reservoir 312, blowing reservoir 312 down to atmospheric pressure.

When demand has been reduced to zero, compressor system 100 continues to run in an unloaded state until a system pressure drop is detected, indicating an air demand. As the pressure drops from an upper, or unload set point, electronic control system 104 resumes operating compressor system 100 in the load/unload operating mode, cycling inlet valve 336 to maintain system pressure in the establish range. When the measured pressure drop indicates that the system is again consuming more than 50% of the machine's capacity, electronic control system 104 leaves inlet valve 336 in the fully open position and resumes use of valves SV1, SV2, SV3, and SV4 to vary the compressor output.

Operating parameters, such as the selection of the number of cycles to be permitted and the length of the predetermined time period in which these cycles must occur to cause switching from the load/unload mode to the modulation mode, can be modified by operator input. Default values of these parameters are also provided. The default settings preferably cause the system to change from load/unload mode to modulation mode if there are more than 10 open-and-close cycles of inlet valve 336 within thirty seconds. However, any other appropriate setting may be selected by the operator if desired.

For operation of compressor system 100 in the continuous run or the auto/dual modes, electronic control system 104 has default settings establishing a full-load pressure and an unloaded pressure. Alternatively, the operator of compressor system 100 may enter a full-load pressure and an unloaded pressure into electronic control system 104 using switch array 704. The full-load pressure established using the default or manual entry is the maximum pressure at which the machine will operate when running at full capacity. As demand for air drops, the pressure in the service air system will rise to the unload pressure. During this rise in pressure, lift valves 322, 324, 326, and 328 are sequentially opened, and as the unload pressure is reached, inlet valve 336 will be closed to fully unload compressor 102. Thus, the full load pressure and the unloaded pressure settings determine a pressure operating range that compressor system 100 will maintain in the service air system. Electronic control system 104 is programmed to prevent entry of full load and unloaded operating parameters which are inappropriate for the particular compressor 102, in view of data specifying its capacity and design characteristics stored in electronic control system 104. For example, electronic control system 104 may be programmed to refuse any minimum full load pressure setting less than 75 PSIG. Also, a minimum acceptable differential between the loaded and unloaded settings can be established. Preferably, the system will require that the unloaded pressure be not less than 10 PSIG above the full load pressure.

To determine the proper pressure and differential settings, several factors must be considered, including the actual pressure required in the service air system to maintain proper equipment performance. For maximum efficiency, the service air pressure provided should be no more than actually needed. Another factor affecting pressure and differential settings is the storage capacity of the service air distribution system. A distribution system with little or no storage capacity will operate better with a wider differential between loaded and unloaded pressure set points. Systems that have more compressed air storage capacity (one gallon per cubic foot of compressor capacity or more) can enhance energy efficiency by using a more narrow pressure differential. Large storage capacities provide more consistent system pressure. If the service air pressure remains steady through a typical work cycle, the differential between the unloaded and full-load values can be reduced to 10 PSIG. If the service air pressure fluctuates greatly with a differential of 15 PSIG, indicating little system storage capacity, the differential may need to be broadened. Another consideration affecting the differential is the nature of air consumption in the service air system. A system that is subject to rapid, cyclic air consumption may require a wider differential than a service air system that has a steady air requirement.

The system is operated with a series of overlapping pressure bands, each of which establishes a range over which one of the capacity controlling valves (including the lift valves and the inlet valve) will be opened. The firmware controlling this operation can be found in module BYPASS.C in the microfiche appendix. Briefly, as the system operates, the pressure in the service air system is sensed and system processor 502 determines whether any of the start points on the pressure dead bands for the lift valves are less than the sensor pressure. Then, the lift valves corresponding to those bands are opened or kept open. Next, system processor 502 determines whether the sensed pressure is less than the close points on any of the pressure dead bands for the lift valves. If so, and if the lift valve is open, it is closed.

In contrast to the method of operation of the lift valve pressure dead bands, inlet valve 336 is closed when the sensed pressure exceeds the close point, and inlet valve 336 is opened when the sensed pressure is less than the open point.

Figure 9:
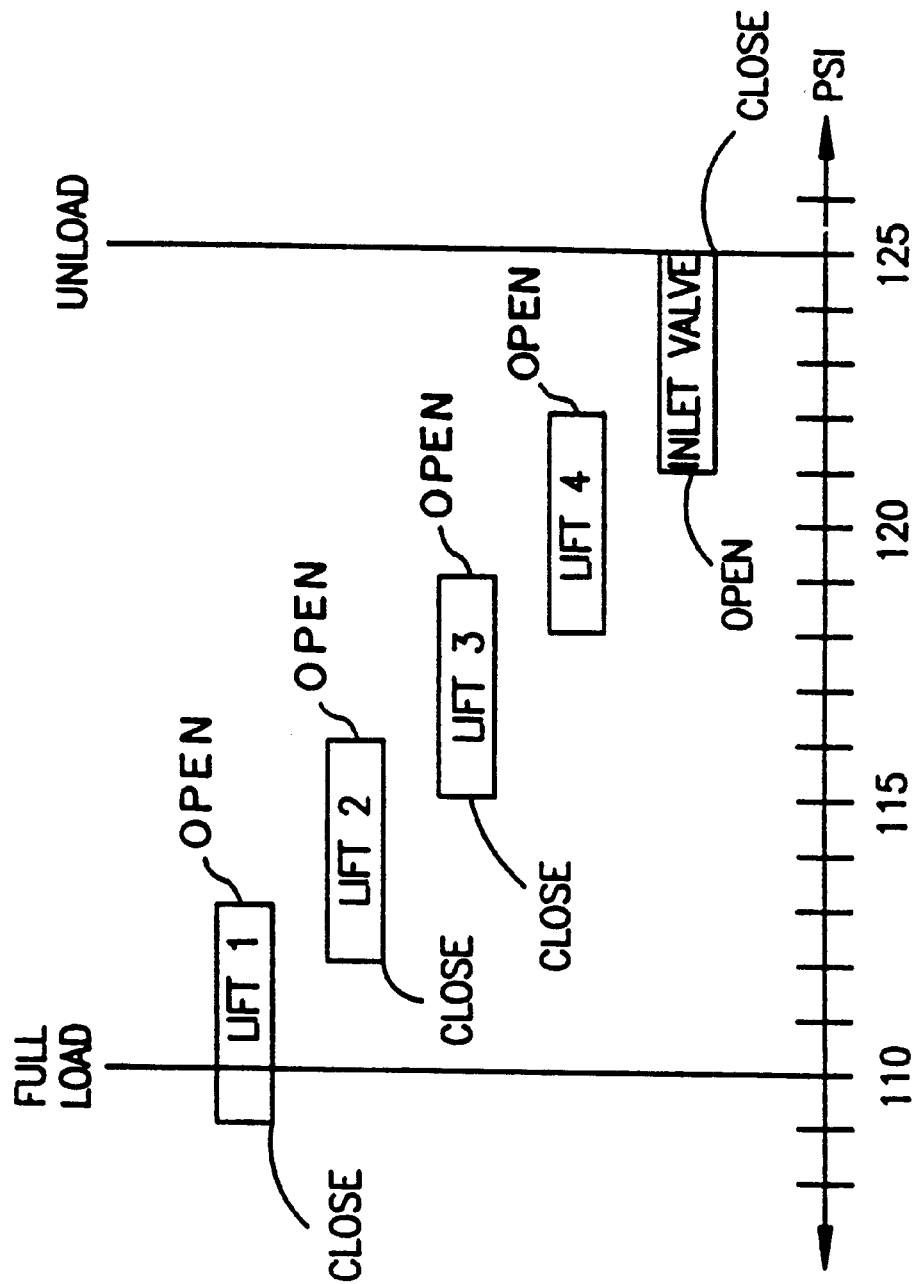
FIG. 9 is a diagram showing the automatic adjustment of pressure bands in continuous run and auto/dual pressure band modes of the present invention.

As noted above, preferably the pressure band ranges for activating the various valves in the system are dynamically calculated by electronic control system 104. These calculations are performed automatically based on the full-load and unloaded pressures selected by the operator. FIG. 9 shows an example of an automatically selected pressure band set according to the present invention for a selected unloaded pressure of 125 PSIG and a loaded pressure of 110 PSIG. Initially, electronic control system 104 calculates the width of the deadbands by calculations providing a result equivalent to the formula:

$$\text{WIDTH}=\text{INT}((\text{unload pressure}-\text{load pressure})/5+0.5)+1.$$

This provides a dead band width that is approximately one-fifth of the range between load pressure and unload pressure. It has been learned from experience that a smoother control operation is obtained if each of the bypass valves pressure range overlaps the next by 1 PSIG, and the WIDTH formula adds an overlap factor of 1 for this purpose. In the example of FIG. 9, the starting pressure ranges for each of the bypass valves would be calculated as follows: WIDTH=(125−100)/5+1=4. The first lift valve will have a lower set point equal to the loaded pressure of the compressor minus 1. Its upper set point will be the lower set point +4 PSIG. The next lift valve will have a lower set point equal to the upper set point of the previous valve −1 PSIG, to provide the desired 1 PSIG overlap. The upper set point of this valve will be calculated as the lower set point +4 PSIG. Each valve's initial pressure range is calculated in the same way. Finally, the inlet valve deadband is set with its open point 1 PSIG below the open point of lift valve 4, and the close point of this deadband is set at the unload pressure.

Preferably, the system can dynamically modify the calculated pressure bands during operation to improve compressor efficiency. In addition, the control may include a proportional-integral-derivative algorithm to change the pressure ranges of the bypass valves to try to maintain a target pressure. Such a PID algorithm would preferably be designed to minimize the need for cycling of the valves. The coefficients in the PID algorithm would preferably be modified dynamically by the firmware in response to observed conditions.

The lift valves should be operated in a specific order. Lift 1 must open before lift 2, lift 2 must open before lift 3, and lift 3 must open before lift 4. The lift valves should be closed in the reverse order. If a higher order by pass valve opens before a lower bypass valve, then the lower one has little or no effect. Also the pressure drop in the system is much greater when a higher order valve opens before a lower one. Such operation is undesirable as it may create oscillations.

The continuous run control mode is most appropriate for systems that have only brief periods of time during which there is no system demand, since compressor motor 214 uses approximately 20% of its normal power even when compressor 102 is unloaded. This would be the most appropriate mode of operation if the service air system has little or no compressed air storage capacity.

The Auto/Dual Control mode operates identically to the Continuous Run mode when responding to system demands. However, when there is no system demand, the Auto/Dual control mode provides a shutdown control function to further increase operating efficiency. Specifically, in the Auto/Dual mode, electronic control system 104 starts an unload or shutdown timer when compressor 102 becomes unloaded because of a lack of air demand. At such times, the air intake valve is held closed as long as the line pressure is greater than or equal to the unloaded pressure. The display on the control shows the user that the compressor is unloaded and the minutes remaining on the unload timer.

The shutdown timer proceeds to count down a preset waiting period. If there has been no drop in system pressure as measured by line pressure transducer 204 during this waiting period, electronic control system 104 turns compressor motor 214 off and stands by, continuing to monitor service air system pressure. When demand is detected in the service air system, electronic control system 104 restarts compressor 102 to satisfy the air requirements. Otherwise, if the line pressure should drop below the unloaded pressure before the shutdown timer times out, the bypass routines will determine at what pressure inlet valve 336 should be opened. The shutdown timer will continue to time out until inlet valve 336 is opened. If the shutdown timer times out, compressor motor 214 is turned off by deenergizing the motor contactor. But if the bypass routines open inlet valve 336 before the shutdown timer is timed out, then the shutdown timer is reset to the full time period the next time inlet valve 336 is closed.

It should also be noted that electronic control system 104 maintains electronic records of system operating hours, including loaded operating hours, unloaded operating hours, intake filter hours, lubricant filter hours, lubricant hours, separator hours, separator filter hours, air filter hours, and line filter hours for diagnostic and maintenance purposes. The operating hour records are maintained automatically. The records of the hours since the filter, lubricants, and separator were changed are maintained automatically, but must be reset manually when the affected component is changed, using an appropriate system menu.

When inlet valve 336 is opened and the compressor 102 is running or started, then the loaded hour count is enabled and the unloaded hour count is disabled. When the motor is running, but inlet valve 336 is closed, time is added to the stored unloaded operating hour count but not to the loaded hour count.

The preferred initial setting for the preset waiting period measured by the shutdown timer is 10 minutes. The purpose of this delay is to prevent motor 214 from starting too many times within a given period. To maximize the energy savings benefit of having a machine off instead of just unloaded, this timer should be set low enough to allow the machine to turn itself off during periods of no demand.

A factor limiting the number of times a motor can be started and stopped is the motor's ability to dissipate the heat generated by current inrush at startup. Most motor manufacturers recommend no more than two starts per hour for the class of motors often used in industrial compressors. The present invention provides an advantageous protective feature to prevent damage to the motor from frequent restarting. When compressor 102 restarts, after having automatically shut down in the auto/dual mode, an anti-rapid cycling timer of 25 minute duration is started. This timer prevents electronic control system 104 from turning motor 214 off until the 25 minute timer has counted down, overriding the established auto/dual preset waiting period before shutdown if necessary, so that the windings have adequate time to dissipate the heat generated at startup, avoiding any breakdown of the insulation on the windings from overheating.

The auto/dual control mode is most appropriately employed in systems that have extended periods (typically 30 minutes or more at a time) during which there is no service air system demand. A very small continuous system demand can be handled with adequate compressed air storage capacity and a reasonable pressure deadband, making possible the power savings associated with turning compressor 102 off during a period of low or nonexistent demand.

The last of the single machine modes, the target pressure mode, was originally designed as a method to efficiently control multiple machines. Since systems that include multiple machines are generally large systems, this method of control takes advantage of the capacity of the inventive electronic control system 104 to control compressor 102 without using a pressure band algorithm. Rather than using a pressure band control method, as in the continuous run mode or the auto/dual mode, the target pressure mode uses a target pressure and a variable response rate. In this mode, electronic control system 104 is programmed with a target pressure and maintains service air system pressure within two or three points of the specified target pressure by varying the output capacity of the compressor. This method of operation may reduce power consumption at part load because the system pressure does not have to climb through a pressure band to start a compressor capacity response. It has been found that this control methods also maintains a more steady pressure throughout a plant compressed air system.

Figure 10:
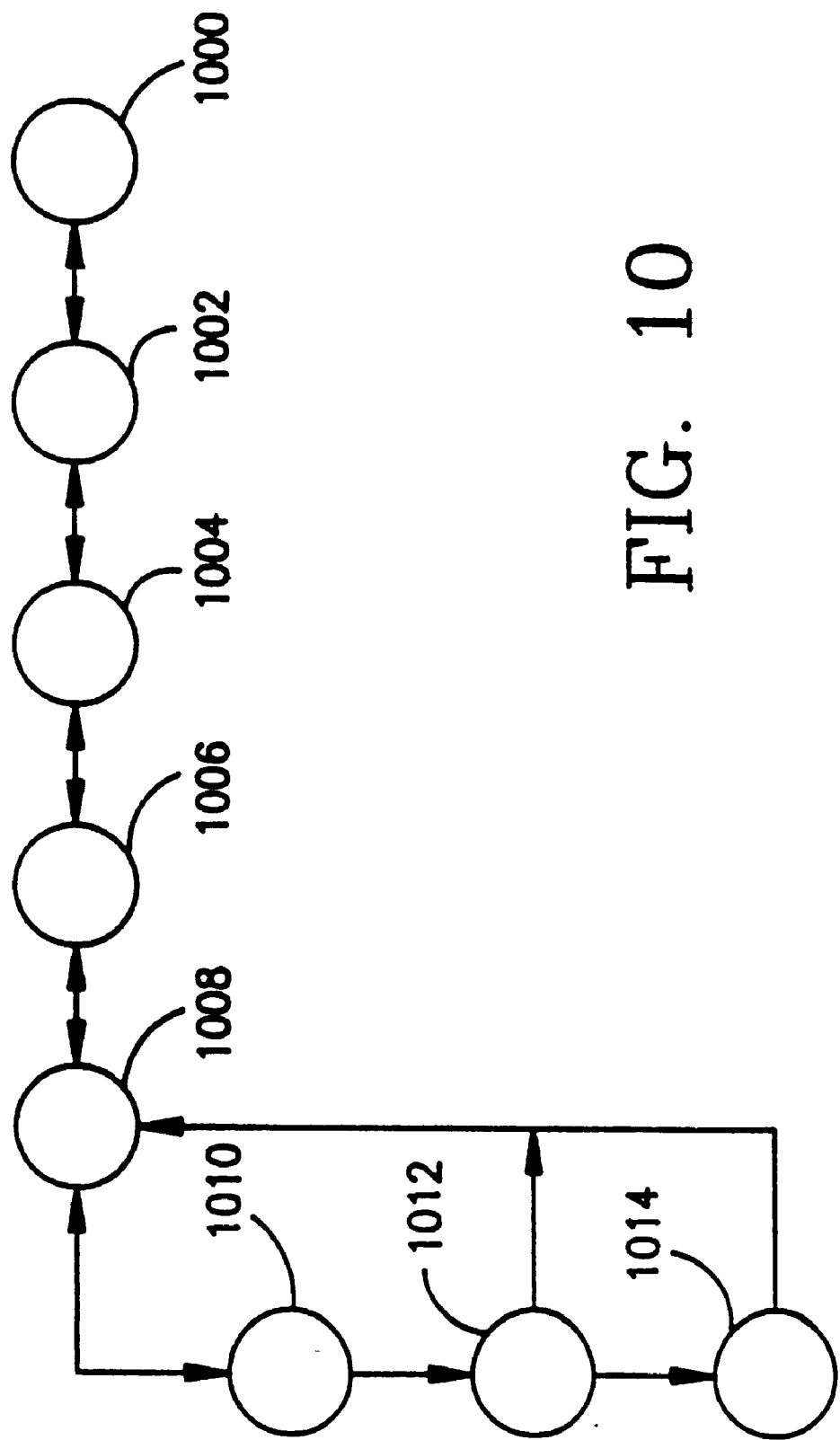
FIG. 10 is a state diagram showing lift valve and cycling operations provided by a target pressure control algorithm of the present invention.

FIG. 10 is a state diagram showing the various states of operation of solenoid valves SV1, SV2, SV3 and SV4, and cycling operations provided by the single machine target pressure control algorithm. In this mode, compressor system 100 begins operation in state 1000, at full capacity output. In state 1002, valve SV1 is actuated to reduce compressor capacity. In state 1004, valve SV2 is also actuated, further reducing capacity. When the system moves to state 1006, valve SV3 is actuated, and in state 1008, valve SV4 is actuated so that the compressor operates at 50% capacity in state 1008. In state 1010, the compressor inlet valve 336 is cycled between open and closed positions with an open duty cycle varying with the capacity desired, to provide a capacity of less than 50% of full compressor capacity. In state 1012, inlet valve 336 is modulated to remain partially closed to provide a reduced compressor capacity. Finally, in state 1014, the inlet valve is closed to unload the compressor and the compressor motor may be shutdown after a predetermined timeout period.

As noted above, operation begins at full capacity, in state 1000. Electronic control system 104 monitors service air pressure using line pressure transducer 204 and continuously compares this pressure to the target pressure. If the measured line pressure in the service air system increases above the target pressure, the system shifts states among states 1000, 1002, 1004, 1006, 1008, and 1010 based on the following state machine algorithm: If line pressure exceeds target pressure by 1 PSIG for six seconds, the state shifts to the left (in the direction of state 1010). Also, if line pressure exceeds target pressure by 2 PSIG for four seconds, the state shifts to the left, and if line pressure exceeds target pressure by 3 PSIG for two seconds, the state shifts to the left. Rightward shifts (toward state 1000) occur when line pressure is less than target pressure; a rightward shift occurs when line pressure is 1 PSIG less than target pressure for six seconds, when line pressure is 2 PSIG less than target pressure for four seconds, and when line pressure remains 3 PSIG less than target pressure for two seconds.

State 1012 is entered from state 1010 when a leftward state shift is appropriate according to the same algorithm described above. However, when a rightward shift from state 1012 is appropriate according to this algorithm, the machine jumps to state 1008, bypassing the cyclical operation of state 1010.

State 1014 (unloading and/or shutdown) is entered when the line pressure continues to rise above the target pressure, despite inlet valve cycling and modulation attempts in states 1010 and 1012, indicating that there is no demand in the service air system. Operation shut from shutdown state 1014 to state 1008 when service air pressure drops below the target pressure, indicating that some demand is again present.

This method of control is preferred for use only in single machine applications that have compressed air storage capacities that exceed one gallon of storage for every cubic foot of compressor capacity and have relatively constant air demands. Significant variations in air demand over time, and/or a lack of buffering of the system pressure by compressed air storage, will result in undesirably frequency cycling of the compressor in this mode.

As indicated previously, in addition to the three single-machine operating modes described above, electronic control system 104 can operate in a networked multiple machine mode. In the Network Mode, all compressors transmit information to all other compressors specifying their capacity and specifications, configuration, maintenance status, current load setting including actuation condition of each of the valves SV1 through SV6, and current measured line pressure at their respective service air connection.

Each system's electronic control system 104 stores the information received from the other networked compressor systems and coordinates operations based on this information about the system. Each networked electronic control system 104 is a peer of the other compressor control systems in the network, so there is no single electronic control system 104 serving as a master control unit. Since each electronic control system 104 constantly maintains full information about network status and controls its own operation based on the data received from all other networked systems, a failure in any particular system will not prevent continued network operation. The failure of a unit to communicate with the networked units will result in automatic reconfiguration of the network to operate without that unit.

For operation in the network mode, the electronic control system 104 of each compressor system 100 automatically identifies itself to the other compressor systems on the network based on a letter code A, B, C, D . . . P assigned by an operator during system installation and stored in nonvolatile memory. This letter code is assigned by the operator for purposes of prioritizing machine operation as will be explained in more detail below. Upon startup of one or more machines, the network automatically configures itself by dynamically assigning a unique network node number to each station for network communication purposes. This automatic configuration of the network occurs without regard to the order of starting of the machines, and the networked systems automatically determine the total number of compressors on the network. If a compressor is added or removed from the network, it is not necessary for the operator to change a compressor total stored in the machines. The connected electronic control systems 104 continuously maintain and exchange operating status information, and each compressor maintains full operating status information on all other compressors in the network. This information preferably includes, for example, whether the compressor is running or stopped, and if stopped, whether the stop was the result of a programmed shutdown such as a timeout, safety shutdown, manual shutdown, or other cause; whether the lift valve algorithm is enabled or disabled; the status of the lift valves open or closed); the compressor's current line pressure and sump pressure; the discharge temperature and sump temperature; the compressor's load and unload pressure settings; the model number, capacity, horsepower, and voltage of the system; whether the compressor is air or water cooled; the state of the oil filter delta pressure switch; the state of the air cleaner delta pressure switch; the state of the motor overload relays; the state of the main motor starter auxiliary contacts; the total hours on the air filter, oil filter, and separator element; the total compressor loaded hours and unloaded hours; the number of unloaded minutes until the compressor shuts down (current auto/dual timer value), compressor's node number; and the number of hours left on the compressor's multiple machine timer. Also, additional special purpose sensors, such as an air flow sensor, may be connected to any particular compressor in the network, using the general input expansion provisions of electronic control system 104 described above with reference to FIG. 5, and all compressors on the network can receive sensor readings from a single sensor, rather than providing separate sensors for each compressor.

The storage of all this information in each compressor and the provided capability of transmitting this information across the network and to remote locations using modem 211 allows monitoring and control operations and coordination of multiple machines that are significantly advanced over prior art systems. Another advantage is provided by the maintenance in each machine of up-to-date status and configuration information on every other networked system, in cases where a modem 211 is connected to any of the networked compressor systems 100 (as shown in FIG. 8). Under these circumstances, status information of all networked compressors can be transmitted by that system to a remotely located station for monitoring and control purposes.

The operator setting up the network assigns to each compressor system 100 in the network a unique sequence identifier such as A, B, C, D, etc. which is used for sequencing and scheduling of the compressors in the network. The term "sequencing" refers to the order in which networked compressors will be brought on and off line to satisfy a system demand. The term "scheduling" refers to the time and day that a particular sequence is to be used. Preferably, electronic control system 104 can store a plurality of sequences along with day and time specifications, and can use the specified sequences at the specified times on the specified days. The goal of proper scheduling is to assign a sequence to a particular time that will assure that the compressors running will be operating as close to full load as possible.

The number of sequences used in a system is dependent on several factors. One factor is operator preference. Electronic control system 104 is provided with a default sequence (alphabetical beginning with "A") and will run in this sequence at all times unless an operator specifies scheduling of different default sequences. Systems will work fine with only one sequence. Systems that use multiples of an identical model compressor may use only one sequence or may use the same number of different sequences as there are machines on the network, thereby equalizing the operating hours on all machines. To optimize energy savings, a study of capacity needs should be conducted and scheduling should be planned as part of the process of sizing the compressors in the network. In this way, the proper sized compressors can be ordered to supply the various system demands using the least amount of power.

The Network Mode of control is used with a plurality of compressor systems 100 connected to a single service air system, as described previously with reference to FIG. 8. Like the single machine target pressure mode described above, the network mode uses an operator adjustable target pressure as a basis for controlling the response of all of the compressor systems 100 to changes in service air system demand.

In this mode, the electronic control systems 104 connected in the network pass an operating pointer, which is distinct from the communications transmission token, and only the machine having the operating pointer can take action to adjust its output capacity. A sequence for startup of the connected compressors as demand increases is programmed into at least one of the connected compressors (unless the default A, B, C . . . P sequence is desired, in which case no programming is necessary) and transmitted to the other compressors in the system. The operating pointer is held by the system 100 that is the next to have its capacity increased in response to a demand increase, according to the programmed sequence. When the system 100 having the pointer is running at full capacity, it passes the pointer "to the right," that is, to the next compressor in the sequence. If demand drops and the system 100 holding the pointer has reduced its capacity by 50% by actuating the capacity reduction valves, it passes the pointer to the preceding system 100 in the programmed sequence. If further capacity reduction is required, the system receiving the pointer will then sequentially actuate its capacity reduction valves until it has opened all four lift valves and reduced its capacity by 50%, at which time it will pass the pointer "to the left," that is, to the next preceding system in the programmed sequence.

With the system at full load, that is, all connected compressors operating at their maximum output, an increase in service air pressure above the target pressure indicates a drop in demand. Electronic control system 100 of the last machine in the sequence, having the pointer, will respond by opening the first valve of the last machine in the sequence. If the pressure remains above or moves above the target pressure again, the control will open additional valves on the last machine to maintain the target pressure. If all valves on the last machine are open and the service air pressure is still above the target pressure, that machine will continue to run at 50% of is capacity and the pointer will be passed "left" to the preceding machine in the sequence, which will begin opening its valves as necessary to reduce service air pressure.

Figure 11:
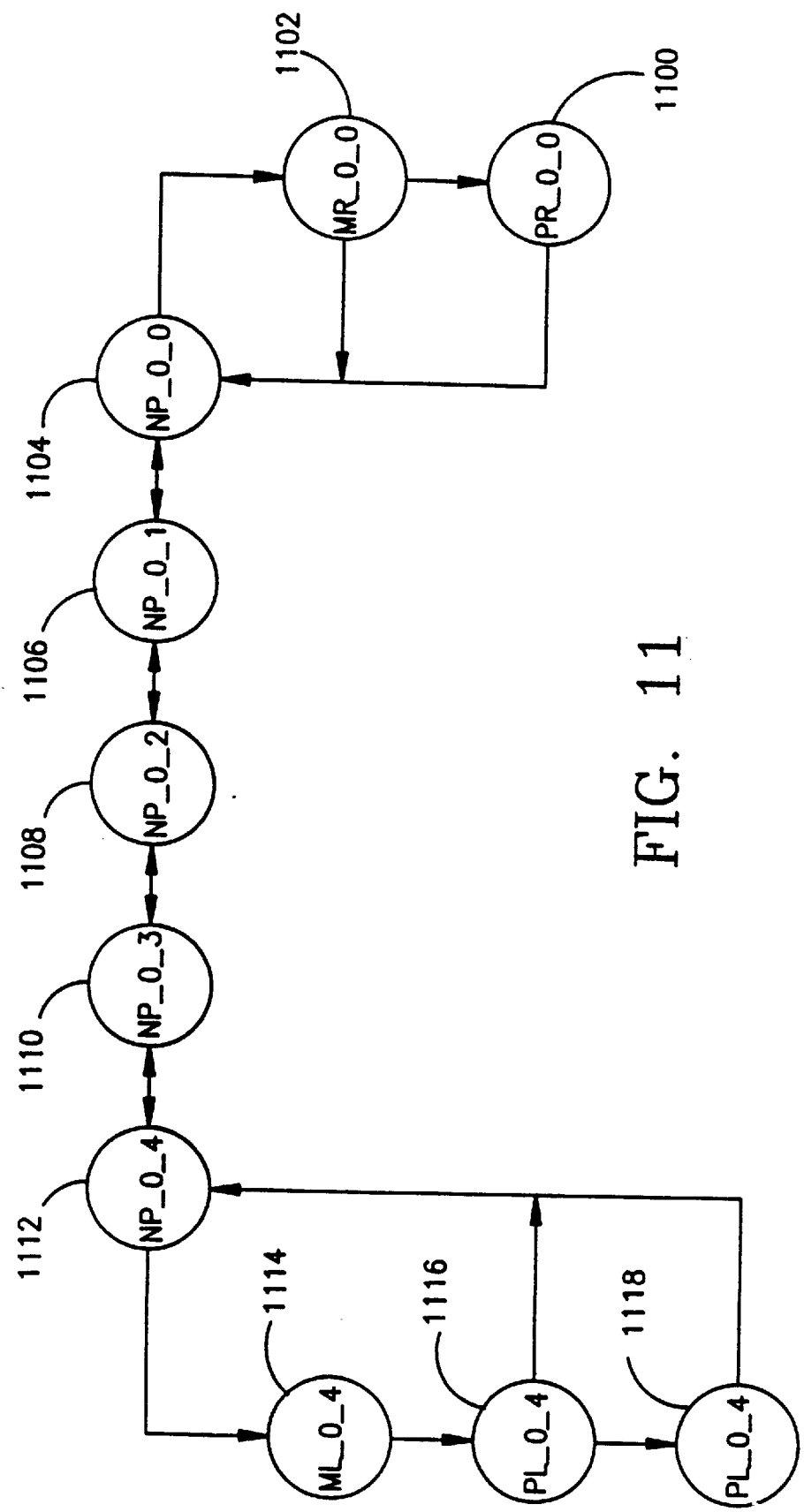
FIG. 11 is a state diagram showing the controls applied by each individual electronic control system when operating in a networked multiple machine target pressure mode.

FIG. 11 is a state diagram showing the controls applied by each individual electronic control system 104 when operating in network mode to maintain target pressure with multiple machines. Each of the networked machines will have an electronic control system 104 that individually operates according to the state diagram shown in FIG. 11. However, as will be seen, through the design of the state diagram and communications between the electronic control systems 104, the electronic control systems 104 will effectively cooperate to maintain the desired target pressure in the system.

As shown in FIG. 11, there are ten operating states of electronic control system 104 in this mode. State 1100 (labeled PR_O_0) is the state existing when system 100 controlled by this electronic control system 104 is operating at full capacity and the pointer has been passed to a machine following this system 100 in the programmed capacity increase sequence. Thus, in state 1100, the machine controlled by the state diagram of FIG. 11 is operating at full capacity. The machine does not have the pointer and is not in a mode to modify its capacity output. In state 1104, the controlled machine has the pointer, but is operating at full capacity with no lift valves open and inlet valve 336 open. In state 1102, the controlled machine passes the pointer to the machine in the programmed network sequence which is to add capacity after capacity addition by this machine. For example, if the default programmed sequence (ABCD) is used, and this machine is B, it will pass the pointer to the machine having sequence designation C. In state 1106, the controlled machine has the pointer and has its inlet valve open and one lift valve open (87.5% capacity). In state 1108, the controlled machine has the pointer and has its inlet valve open and two lift valves open (75% capacity). In state 1110, the controlled machine has the pointer and has its inlet valve open and three lift valves open (62.5% capacity). In state 1112, the controlled machine has the pointer and has its inlet valve open and all four lift valves open (50% capacity).

In state 1114, the machine operates at 50% capacity with its inlet valve open and all four lift valves open, and passes the pointer to the preceding machine in the designated network sequence so that the preceding machine can control its capacity in response to system requirements. Using the same example as before, if the default programmed sequence (ABCD) is used, and this machine is B, in state 1114 it will pass the pointer to the machine having sequence designation A. In state 1116, the machine has passed the pointer to the machine having the preceding sequence designation (or, if this is the "base load" machine last in the sequence, the machine has determined this and retains the pointer). In this state, the machine remains at 50% capacity. In state 1118, the machine closes its inlet valve to unload the controlled compressor. In this state, the machine's shutdown timer begins to count down, and if the shutdown timer times out (for example, no load has been placed on the machine for 10 minutes), the machine will be shut down.

The machine represented in FIG. 11 is a rule based state machine, having the following rules: possession of the pointer enables operation of the lift valves on the controlled machine. Those machines with a later position in the sequence have lift valves open and locked (50% or lower capacity); those machines with an earlier sequence position have their lift valves closed and locked (100% capacity). Those machines with a later position in the sequence may be selectively unloaded, while all machines with an earlier position in the sequence will be fully loaded. When the capacity reduction produced by the lift valves opening in this machine and the machines after it in the sequence exceeds the total output capacity of a machine following it in the sequence which is running at 50% capacity, that machine will unload and the lift valves will close, thus maintaining the same capacity, but with one machine unloaded rather than several machines running at 50% capacity.

In this mode, only one compressor at a time should be started within the network. Preferably, compressors will be started beginning with the last compressor in the sequence and moving toward the first compressor in the sequence. However, the network will automatically stabilize to provide the necessary service air pressure regardless of the startup sequence. Each machine has a local override to unload the machine if its unload pressure is reached.

The rules for moves between states in FIG. 11 window will now be explained in more detail. The machine moves from state 1114 to 1116 if (a) the machine preceding this machine in the sequence has accepted the pointer or (b) this machine is the "base load" machine so there is no machine earlier in the sequence to accept the pointer. The machine moves from state 1116 back to state 1112 if the pointer is returned to this machine because a capacity increase is needed. The machine moves from state 1116 to 1118 if the capacity from lift valves opened in machines after this machine in the sequence equals the capacity of this machine's inlet valve. The machine moves from state 1118 to state 1112 if (a) this is the "base load" machine and the pressure is less than target pressure or (b) the machine preceding this machine in the sequence is passing the pointer back to this machine because a capacity increase is needed.

At the other end of the state diagram of FIG. 11, the machine moves from state 1102 to state 1104 if the pointer is not accepted by the machine after this machine in the programmed sequence. The machine moves from state 1102 to 1100 if the pointer is accepted by the machine immediately after this machine in the sequence. The machine moves from state 1100 to state 1104 if this machine is the trim machine or if the pointer is received from the machine after this machine in the sequence.

In the centrally located states of the state diagram of FIG. 11, electronic control system 104 monitors the average of the service air pressure readings determined from each networked system's line pressure transducer 204, and continuously compares this pressure to the target pressure. If the measured line pressure in the service air system increases above the target pressure, the system shifts states among states 1104, 1106, 1108, 1110, and 1112 based on the following state machine algorithm: If averaged line pressure exceeds target pressure by 1 PSIG for six seconds, the state shifts to the left (in the direction of state 1112). Also, if line pressure exceeds target pressure by 2 PSIG for four seconds, the state shifts to the left, and if line pressure exceeds target pressure by 3 PSIG for two seconds, the state shifts to the left. Rightward shifts (toward state 1104) occur when line pressure is less than target pressure; a rightward shift occurs when line pressure is 1 PSIG less than target pressure for six seconds, when line pressure is 2 PSIG less than target pressure for four seconds, and when line pressure remains 3 PSIG less than target pressure for two seconds.

In state 1112, when a leftward shift is specified by this state machine algorithm, the machine moves to state 1114, but is then controlled by the requirements of state 1114 rather than by the state machine algorithm. Similarly, in state 1104, when a rightward shift is specified by the state machine algorithm, the machine moves to state 1102, where it passes the pointer and ceases operating using the state machine algorithm.

Thus, it can be seen that the networked target pressure method of control used by electronic control system 104 moves a control pointer through the sequence from left to right. If the sequence was "ABCD", the pointer starts at the "A" machine. The "A" machine controls its capacity to maintain the assigned target pressure. If "A" is at full capacity and cannot maintain the target pressure, the pointer passes to the "B" machine. The "B" machine starts and controls its capacity to maintain the target pressure. This would continue, if the demand were great enough, until all machines were running and the pointer was at the "D" machine. If demand diminished and system pressure stared to rise, the pointer would move from right to left through the sequence to maintain the desired target pressure.

One important feature of the invention is its ability to selectively open valves or shut down compressors, depending on the available compressor capacities and the demand. This feature is made possible by the communication between compressor systems 100 in the peer-to-peer network, which includes transmission of information about the capacity of each compressor in the system. In the preferred embodiment, it is possible for the networked compressor systems to coordinate their operations so that their capacity reduction valves are sequentially opened in response to reduced 2demand. However, in some circumstances it may be desirable to shut down one of the networked compressors rather than running several networked compressors at reduced capacity. Thus, the network monitors the total unloaded capacity based on the number of valves open on the individual compressors. When the total unloaded capacity exceeds the total capacity of the first compressor system 100 in the sequence, electronic control system 104 unloads the first compressor system 100 and begin its shutdown timer. The valves on the other networked machines are automatically adjusted to compensate for this capacity reduction. If the first machine in the sequence is much larger than the subsequent machines, more than one machine may have to open valves before the total capacity of the first machines is exceeded and it is turned off.

The speed with which electronic control system 104 responds to changes in service air system demand is determined by the rate at which the demand changes. If the service air pressure moves away from the target pressure quickly, electronic control system 104 will react more quickly. If the system pressure moves away from the target pressure slowly, electronic control system 104 will react slowly.

Electronic control system 104's response is not based solely on changes in service air system pressure, but is dependent also on the rate of change in service air system pressure. The rate of change is a function of the change in capacity requirements of the service air system. Because the algorithms employed in electronic control system 104 in this mode are capacity-based and not pressure-based, there is no pressure differential requirement between machines on the network. All machines in a properly designed system are operated at the same pressure. This capacity-based operation allows electronic control system 104 to recognize the possibility that slow rates of change may be the result of a transitory demand. The use of a blowgun to clean a table, for example, may cause only a brief demand on the system. Systems that are strictly pressure-based would not recognize this and might turn on a large compressor, if the pressure drop happened to pass the control set point. In a well-designed pressure-based control scheme, this large compressor would run about twenty minutes unloaded and then shut down again. In some pressure-based control schemes, this large compressor may come on line and then continue running with all other system compressors throttled back. Since the networked mode of the present invention does not rely on pressure set points to trigger control changes, it would recognize that a slow rate of change may indicate a minimal change in demand that may be short-lived. Thus, in this mode electronic control system 104 may delay adding additional capacity, understanding that slow rates of change often reverse themselves.

A rapid rate of change indicates a major change in system capacity demand, and electronic control system 104 will respond quickly to prevent system pressures from rising or falling from the target pressure.

In contrast, other, pressure-based control algorithms wait until the system pressure has risen or fallen through their set points before responding to these changes. In systems that use a delay-to-start timer, the pressure can fall to the point that several machines have received a signal to start, but none have started. The result of this delay can be a system pressure that is lower than that required to run tools and processes efficiently. Thus, the capacity-based control algorithms implemented in the network mode of the present invention provide significant advantages over pressure based control algorithms.

In some applications, existing plant air system conditions may not allow multiple machines to be installed in one location and fed into a header without line losses. Machines may be located in different parts of a facility and be piped into a loop air system with different pressure drops through various sizes of pipe, filters and dryers. The Network Mode is designed to compensate for these application conditions. In particular, in the network mode each connected machine uses an average of all compressor discharge pressures to determine proximity to the target pressure. Individual compressor systems 100 use their local electronic control system 104 to determine how they are going to satisfy the demands of the network. If one machine, for example, was piped into the system in such a way that it had to run 10 or 15 PSIG higher at the discharge than the other machines, to maintain the desired target pressure this machine would prevent a motor overload by reducing the capacity of the compressor to meet the higher pressure requirement of its position in the system. This reduction in capacity would be communicated to the other machines on the network so that the revised network capacity could be used to determine responses to changes in demand. Additional power savings and increased network capacity can be realized by reducing or eliminating these line losses.

In addition to its operating mode features, electronic control system 104 has advantageous automated shutdown and startup sequences and extensive real-time diagnostics that minimize damage to components and danger to personnel due to failures or errors in connecting and operating the system.

Figure 12:
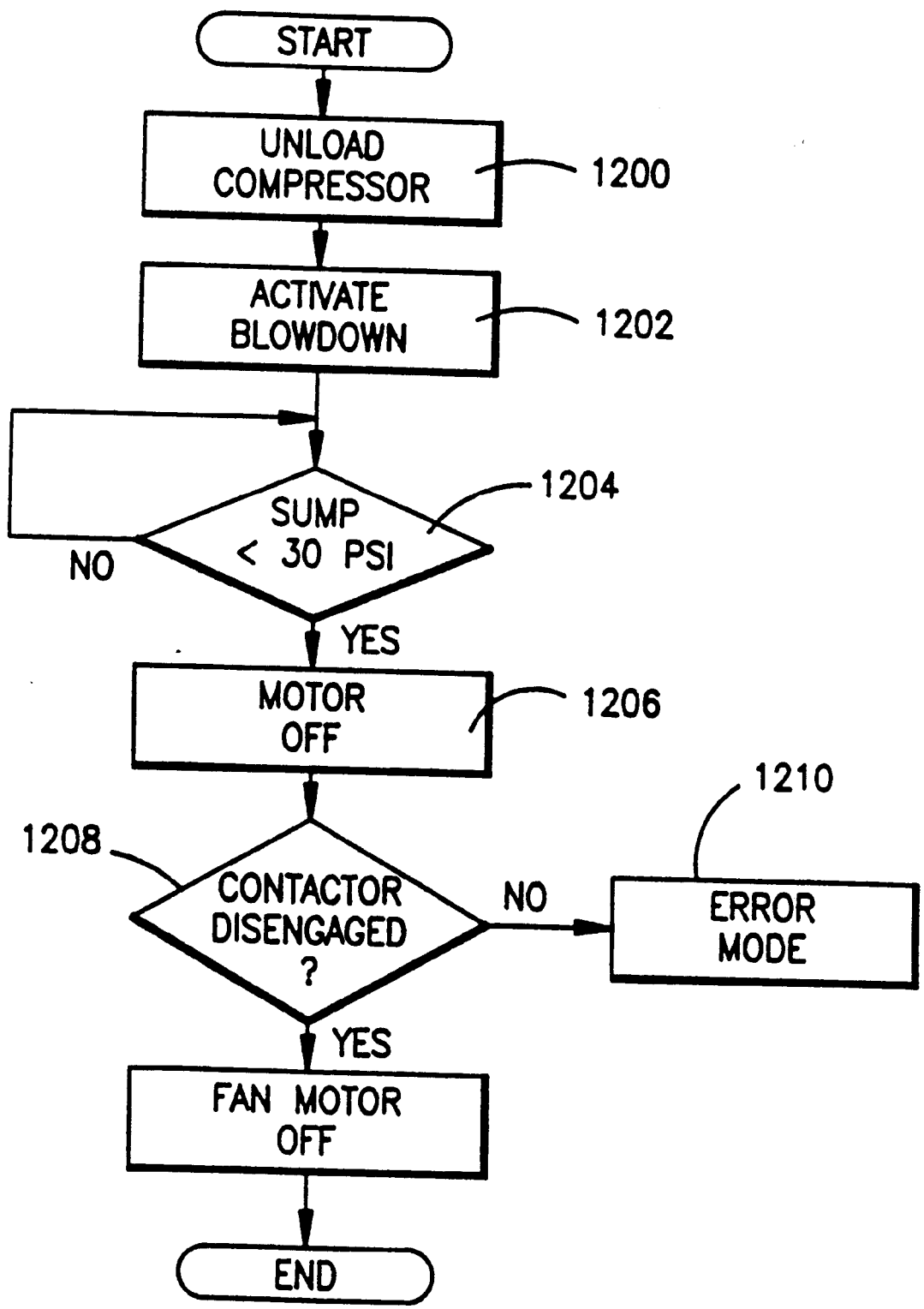
FIG. 12 is a flowchart of an automatic shutdown sequence of the present invention.

FIG. 12 is a flowchart showing an automated shutdown sequence of the present invention. The automated shutdown sequence of FIG. 12 is distinguished from an emergency shutdown in which power is immediately removed from the compressor. The preferred automated shutdown sequence provides an orderly shutdown of the components of compressor system 100 to minimize maintenance problems and make the system ready for restarting when necessary.

The orderly automated shutdown sequence is initiated by an operator pressing the programmed shutdown button included in switch array 704. In the first step of the shutdown sequence, as shown at block 1200 of the flowchart, compressor 102 is unloaded by closing inlet valve 336. In the next step, shown at block 1202, blowdown valve SV6 is activated to release sump pressure. To prevent oil foaming in the system, electronic control system 104 monitors sump pressure and waits until sump pressure drops below 30 PSI, as shown in block 1204. Once sump pressure drops below 30 PSI, control passes to block 1206 and the power to compressor motor 214 is disconnected by controlling the motor contactor.

For air cooled compressor systems, electronic control system 104 then checks, in block 1208, whether the contactor disengaged in response to the shutdown command issued in block 1206. If the contactor of motor 214 fails to disengage during the shutdown sequence, control passes to block 1210, and electronic control system 104 displays a warning message to an operator, and maintains power to the cooling fan until the power is removed from compressor system 100 to prevent overheating of the compressor. If the contactor disengages properly, the fan motor is turned off in block 1212 and the orderly shutdown process is complete.

If the programmed shutdown button in switch array 704 is pressed again at any time during the shutdown process, the shutdown process is reversed and the compressor is returned to its previous operating state. This feature avoids loss of the compressor's contributions in cases where the programmed shutdown button was pressed by accident, and it allows use of the programmed shutdown process to test inlet valve 336. Inlet valve 336 can be tested by pushing the programmed shutdown button, observing whether inlet valve 336 closes immediately in response (as it should), and pushing the programmed shutdown button again to reverse the shutdown sequence, reopening inlet valve 336 and continuing operation of the compressor.

Figure 13:
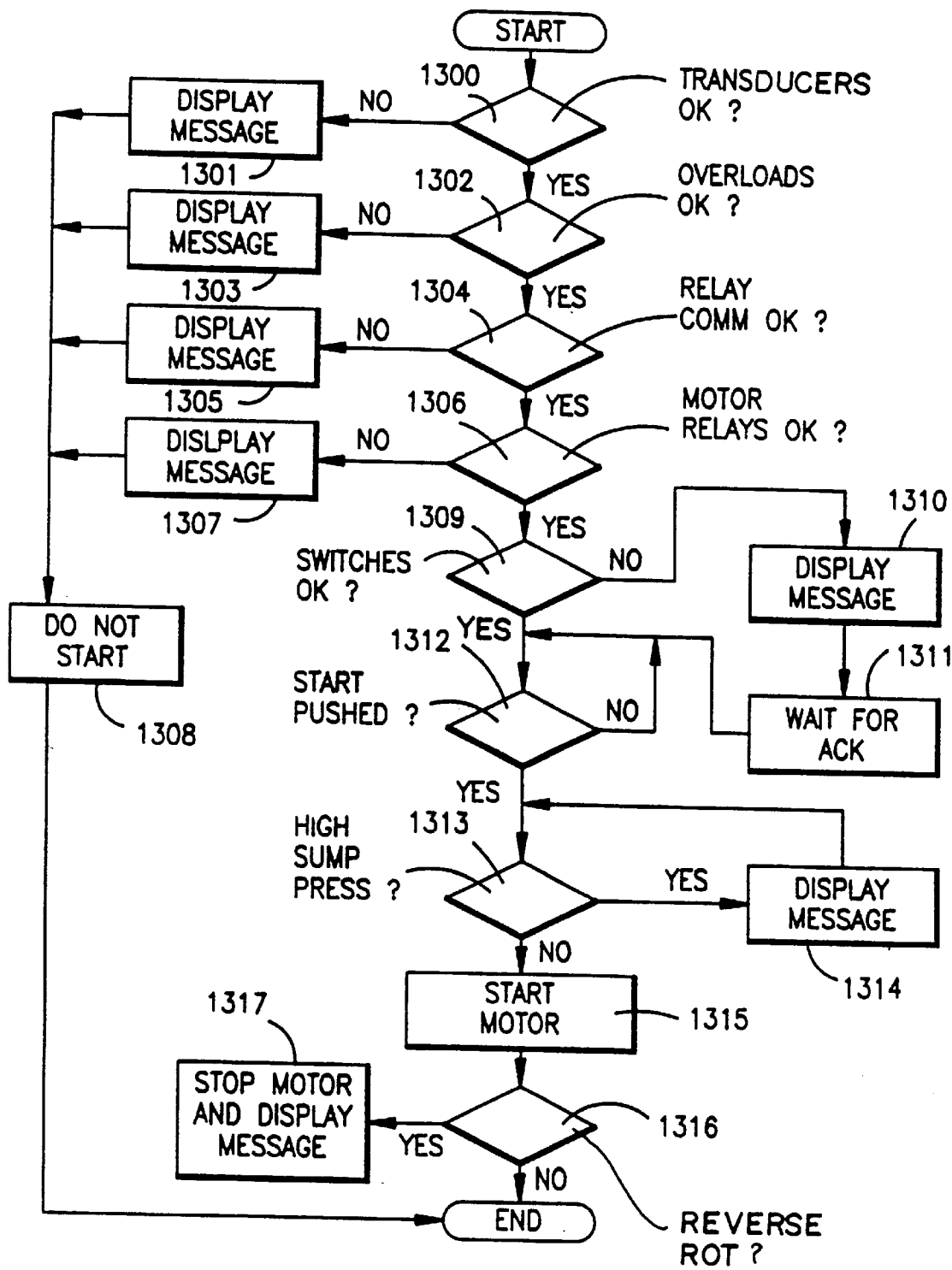
FIG. 13 is a flowchart showing a start up test sequence of the present invention.

FIG. 13 is a flowchart showing a startup check diagnostic sequence of the present invention. This sequence is performed whenever power is applied to compressor system 100 to confirm that the machine is ready to operate. The startup check diagnostic sequence begins in block 1300 with a check of the sump and line temperature and pressure transducers, including line pressure transducer 204, sump pressure transducer 206, sump temperature transducer 208, and discharge temperature transducer 210. If valid signals are not detected from any of these sensors, control passes to block 1301 and an error message is displayed. Otherwise, in block 1302, the fan and main driver motor overloads are checked, and if either is tripped, control passes to block 1303 and an error message is displayed. If no abnormalities are detected, communications with relay board 400 are checked in block 1304. In case of a failure of serial communications between microprocessor board 500 and relay board 400, control passes to block 1305 and an error message is displayed. Otherwise, in block 1306, the system checks to be sure that the motor control relays, any remote starting relays, and the wye connection relay, if so equipped, are disengaged. If any of the control relays are engaged (at this point, they should be disengaged), control passes to block 1307 where an error message is displayed.

In the case of transfer of control to any of blocks 1301, 1303, 1305, and 1307 for display of an error message, the routine continues with block 1308 where the startup routine ends without starting the motor. This action is taken because the faults detected in blocks 1300, 1302, 1304, and 1306 are serious and it could be dangerous to start the compressor when a serious fault condition exists.

If no serious fault condition has been detected, control passes to block 1309 where the air cleaner vacuum switch and lubricant filter delta pressure switch are tested. If the signals generated by these switches are not within an expected range, control passes to block 1310 where a diagnostic message is displayed for the operator. These faults are not considered serious, and the operator can acknowledge this diagnostic message and proceed with compressor startup by pressing the enter button in switch array 704, as shown in block 1311. Following either block 1309 or block 1311, the startup diagnostic process continues in block 1312 where the routine prompts the operator to press the start button of electronic control system 104 to actually start compressor 102. When the start button is pressed, the routine continues at block 1313 where the system checks for sump pressure greater than 20 PSIG. Electronic control system 104 prevents starting of compressor 102 when there is existing sump pressure greater than 20 PSIG to avoid starting the compressor against a load. If sump pressure exceeds this level, a message is displayed in block 1314 and the system waits until the sump pressure is relieved through the blowdown valve, after which the startup procedure will continue.

Electronic control system 104 also prevents running the compressor in reverse, which can damage the compressor. Reversing the connections of two of the three power phase connections to compressor motor 214 causes reverse rotation of compressor motor 214. Since wiring connections are made with the power off, it is difficult to tell the orientation of the power phases when making these connections. Thus, when installing a new compressor motor, it is common to find that the motor has inadvertently been connected to run in a direction opposite from the desired direction. In the past, when connecting power to a newly installed compressor motor 214, it was a common practice to remove a safety guard covering the coupling between compressor motor 214 and compressor 102, start the motor, and observe the direction of rotation of compressor motor 214 to verify proper operation, because reverse rotation of compressor 102 can quickly damage the compressor.

In block 1315, the motor is started, and in block 1316, electronic control system 104 immediately determines whether reverse rotation is present and if so, displays an error message and automatically shuts compressor 102 down in block 1317 before any damage occurs. To accomplish the determination in block 1316, as soon as the engagement of the motor contactor is detected, electronic control system 104 monitors sump pressure to determine whether sump pressure is increasing. If a 2 PSIG sump pressure is not detected within three seconds of engagement of the motor contactor, reverse rotation is detected and control passes to block 1317.

Additional information on the operation of the present invention is contained in the "Operator's Manual for Power$mart (R)" Part Number 50102A100 dated May, 1994, available from Quincy Compressor division of Coltec Industries, Inc., Bay Minette, Ala., which is incorporated herein by reference.

We claim:

1. A method of electronically preventing reverse rotation operation in a rotary air compressor connected by a sump to an air pressure system, the sump having a pressure sensor for measuring positive pressure in the sump, the method comprising the acts of:

storing a wait time and a predetermined minimum operating pressure value;

receiving an instruction to start the compressor;

detecting the start instruction and starting the compressor;

automatically retrieving the wait time and predetermined minimum operating positive pressure value;

automatically waiting until the expiration of the wait time after starting of the compressor and then determining the magnitude of the positive pressure in the sump using the sump pressure sensor; and automatically stopping the compressor and providing a reverse rotation indication if the determined pressure is less than the predetermined minimum operating positive pressure value at the expiration of the wait time.

2. A system for electronically preventing reverse rotation operation in a rotary air compressor connected by a sump to an air pressure system, the sump having a pressure sensor for measuring positive pressure in the sump, the system comprising:

means, operatively connected to the system, for storing a wait time and a predetermined minimum operating pressure value;

means, operatively connected to the system, for receiving an instruction to start the compressor;

means, operatively connected to the system, for detecting the start instruction and starting the compressor;

means, operatively connected to the storing means, for automatically retrieving the wait time the and predetermined minimum operating positive pressure value;

means, operatively connected to the retrieving means, for automatically retrieving the wait time the and predetermined minimum operating positive pressure value;

means, operatively connected to the retrieving means, for automatically waiting until the expiration of the wait time after starting of the compressor and then determining the magnitude of the positive pressure in the sump using the sump pressure sensor; and means, operatively connected to the compressor, for automatically stopping the compressor and providing a reverse rotation indication if the determined pressure is less than the predetermined minimum operating positive pressure value at the expiration of the wait time.

* * * * *